US010559963B2

(12) United States Patent
Nakao

(10) Patent No.: US 10,559,963 B2
(45) Date of Patent: Feb. 11, 2020

(54) BALANCE CORRECTION APPARATUS AND ELECTRIC STORAGE SYSTEM

(71) Applicant: EVTD Inc., Tokyo (JP)

(72) Inventor: Fumiaki Nakao, Shizuoka (JP)

(73) Assignee: NExT-e Solutions Inc., Tokyo (JP)

( * ) Notice: Subject to any disclaimer, the term of this patent is extended or adjusted under 35 U.S.C. 154(b) by 831 days.

(21) Appl. No.: 14/488,252

(22) Filed: Sep. 16, 2014

(65) Prior Publication Data

US 2015/0002083 A1    Jan. 1, 2015

Related U.S. Application Data

(63) Continuation of application No. PCT/JP2013/000654, filed on Feb. 6, 2013.

(30) Foreign Application Priority Data

Mar. 19, 2012 (JP) .................................. 2012-062682

(51) Int. Cl.
*H02J 7/00* (2006.01)

(52) U.S. Cl.
CPC .................. *H02J 7/0014* (2013.01)

(58) Field of Classification Search
CPC ............................. H02J 7/0014; H02J 7/0016
USPC .......................................... 320/107, 116, 122
See application file for complete search history.

(56) References Cited

U.S. PATENT DOCUMENTS

| | | | |
|---|---|---|---|
| 5,998,967 A | 12/1999 | Umeki et al. | |
| 2009/0195079 A1* | 8/2009 | Barrenscheen | H02J 7/0016 |
| | | | 307/109 |

(Continued)

FOREIGN PATENT DOCUMENTS

| | | |
|---|---|---|
| CN | 1489236 A | 4/2004 |
| JP | 2006-067742 A | 3/2006 |
| JP | 2008-017605 A | 1/2008 |
| JP | 2009-232660 A | 10/2009 |

OTHER PUBLICATIONS

International Preliminary Search Report for International Patent Application No. PCT/JP2013/000654, issued by the International Bureau of WIPO dated Oct. 2, 2014.

(Continued)

*Primary Examiner* — Richard Isla
*Assistant Examiner* — Johali A Torres Ruiz

(57) ABSTRACT

A balance correction apparatus is stopped at an appropriate timing. Provided are an inductor; a first switching device electrically connected between another end of the inductor and another end of the first electric storage cell; a second switching device electrically connected between another end of the inductor and another end of the second electric storage cell; and a control section supplying a control signal to control ON/OFF operations of the first switching device and the second switching device, to the first switching device and the second switching device, where the control section obtains information representing a voltage difference between the first electric storage cell and the second electric storage cell, and the control section supplies the control signal to cause both of the first switching device and the second switching device to operate to be OFF, when the voltage difference is equal to or smaller than a predetermined value.

17 Claims, 10 Drawing Sheets

(56) References Cited

U.S. PATENT DOCUMENTS

| | | | |
|---|---|---|---|
| 2010/0327807 A1* | 12/2010 | Kikinis | H02J 7/0016 |
| | | | 320/116 |
| 2012/0313439 A1 | 12/2012 | Yamaguchi et al. | |
| 2012/0319652 A1* | 12/2012 | Namou | H02J 1/108 |
| | | | 320/116 |
| 2014/0009116 A1 | 1/2014 | Nakao | |

OTHER PUBLICATIONS

Notice of First Office Action for Patent Application No. 201380013341.6, issued by the State Intellectual Property Office of the People's Republic of China (Chinese Patent Office) dated Jun. 3, 2016.
Extended European Search Report for European Patent Application No. 13 764 846.5, issued by the European Patent Office dated Oct. 7, 2015.
Notice of Second Office Action for Patent Application No. 201380013341.6, issued by the State Intellectual Property Office of the People's Republic of China dated Dec. 12, 2016.
Office Action issued for counterpart Japanese Application 2014-505983, issued by the Japan Patent Office dated Dec. 6, 2016.
International Search Report for International Application No. PCT/JP2013/000654, issued by the Japanese Patent Office dated May 7, 2013.
European Office Action issued for European Patent Application No. 13 764 846.5, issued by the European Patent Office dated Jun. 13, 2018.

* cited by examiner

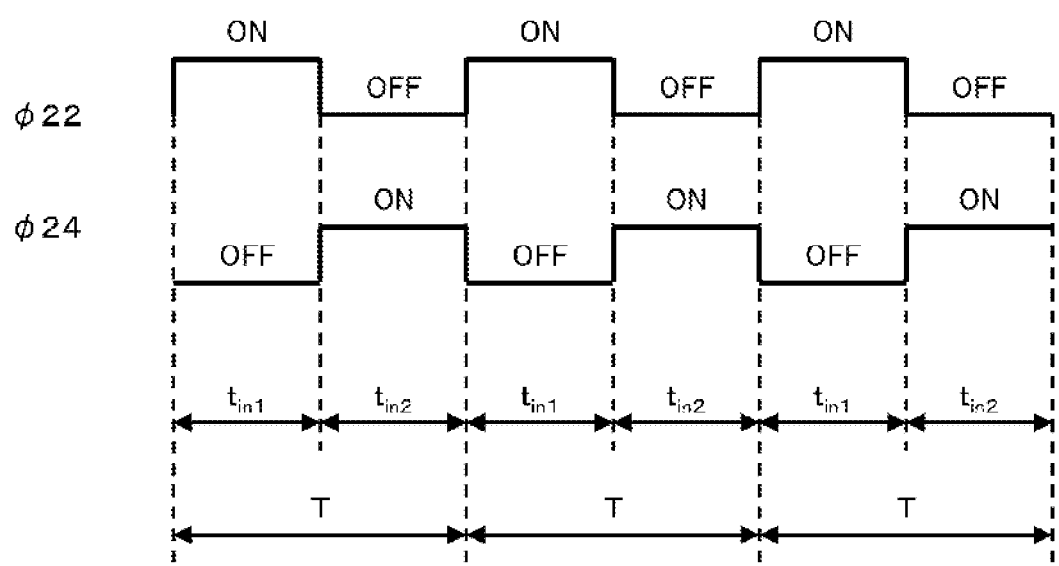
F I G . 5

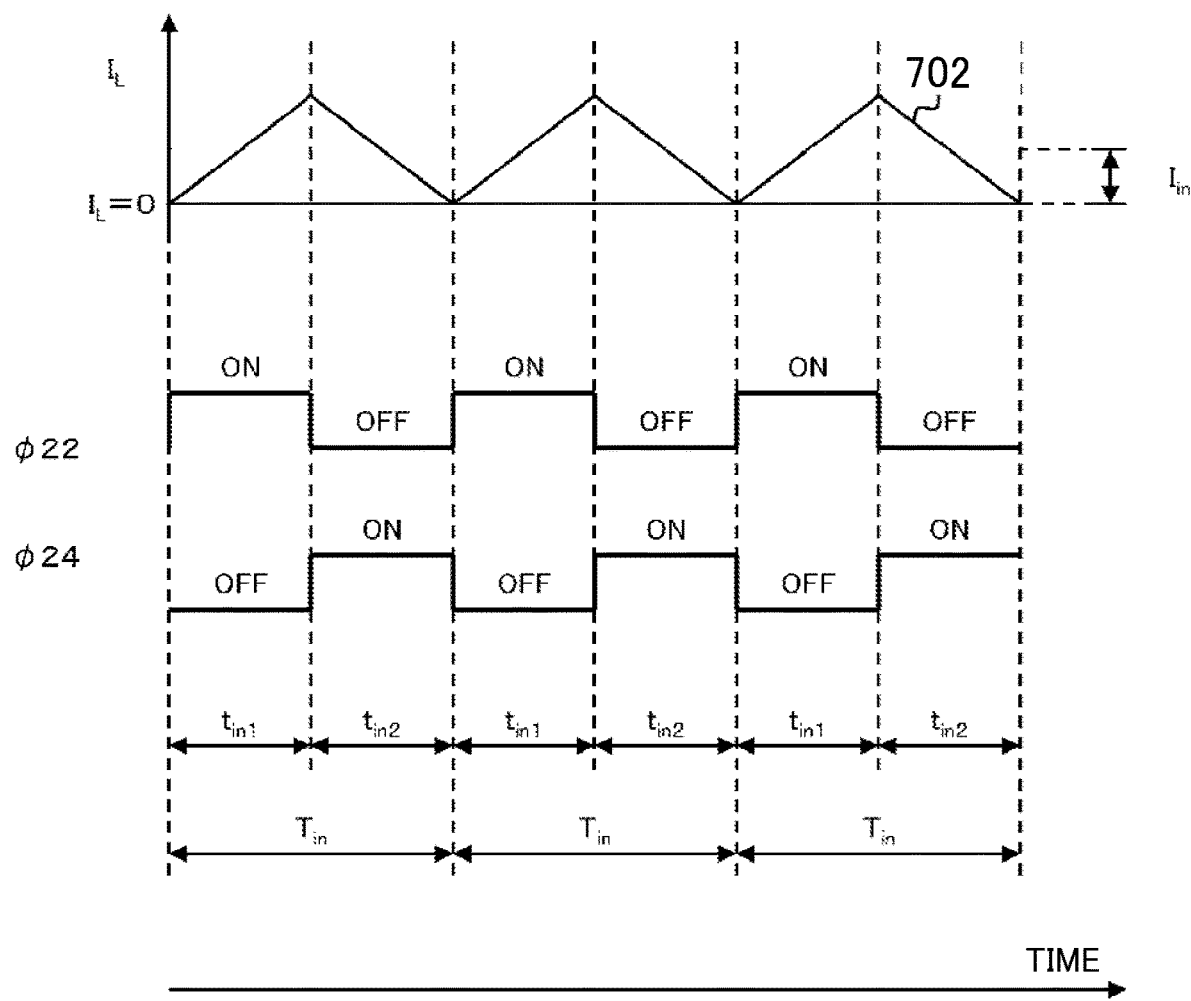
F I G . 7

BALANCE CORRECTION APPARATUS AND ELECTRIC STORAGE SYSTEM

CROSS REFERENCE TO RELATED APPLICATION

The contents of the following Japanese patent application and PCT patent application are incorporated herein by reference:
NO. 2012-062682 filed on Mar. 19, 2012, and
NO. PCT/JP2013/000654 filed on Feb. 6, 2013.

BACKGROUND

1. Technical Field

The present invention relates to a balance correction apparatus and an electric storage system.

2. Related Art

Many electric storage cells connected in series may be used. In that case, when there is variation caused between voltage of these electric storage cells, the capacity of the electric storage cells cannot be effectively made use of to result in reduction in the availability of electricity amount. So as to tackle with this problem, a balance correction circuit that includes a balance correction circuit has been proposed to equalize the voltage of electric storage cells (Please refer to Patent Documents No. 1-No. 3).

PATENT CITATIONS

Patent Document 1: Japanese Patent Application Publication No. 2006-067742
Patent Document 2: Japanese Patent Application Publication No. 2008-017605
Patent Document 3: Japanese Patent Application Publication No. 2009-232660

SUMMARY

It is difficult to stop the above-mentioned balance correction circuit in the state in which the voltage difference between the electric storage cells has become extremely small, due to manufacturing errors or the like of the driving circuit. If the equalization operation is continued when the voltage difference between the electric storage cells is small, power will be consumed to drive the switching devices. In view of this, it is desirable to stop the balance correction circuit at an adequate timing. Therefore, it is an object of an aspect of the innovations herein to provide a balance correction apparatus and an electric storage system, which are capable of overcoming the above drawbacks accompanying the related art. The above and other objects can be achieved by combinations described in the claims. The dependent claims further define advantageous specific examples of the present invention.

BRIEF DESCRIPTION OF THE DRAWINGS

FIG. 5 schematically shows an example of the control signals $\varphi 22$ and $\varphi 24$ after operation start.
FIG. 7 schematically shows another example of the control signals $\varphi 22$ and $\varphi 24$ after operation start.

DESCRIPTION OF EXEMPLARY EMBODIMENTS

Figure 1:
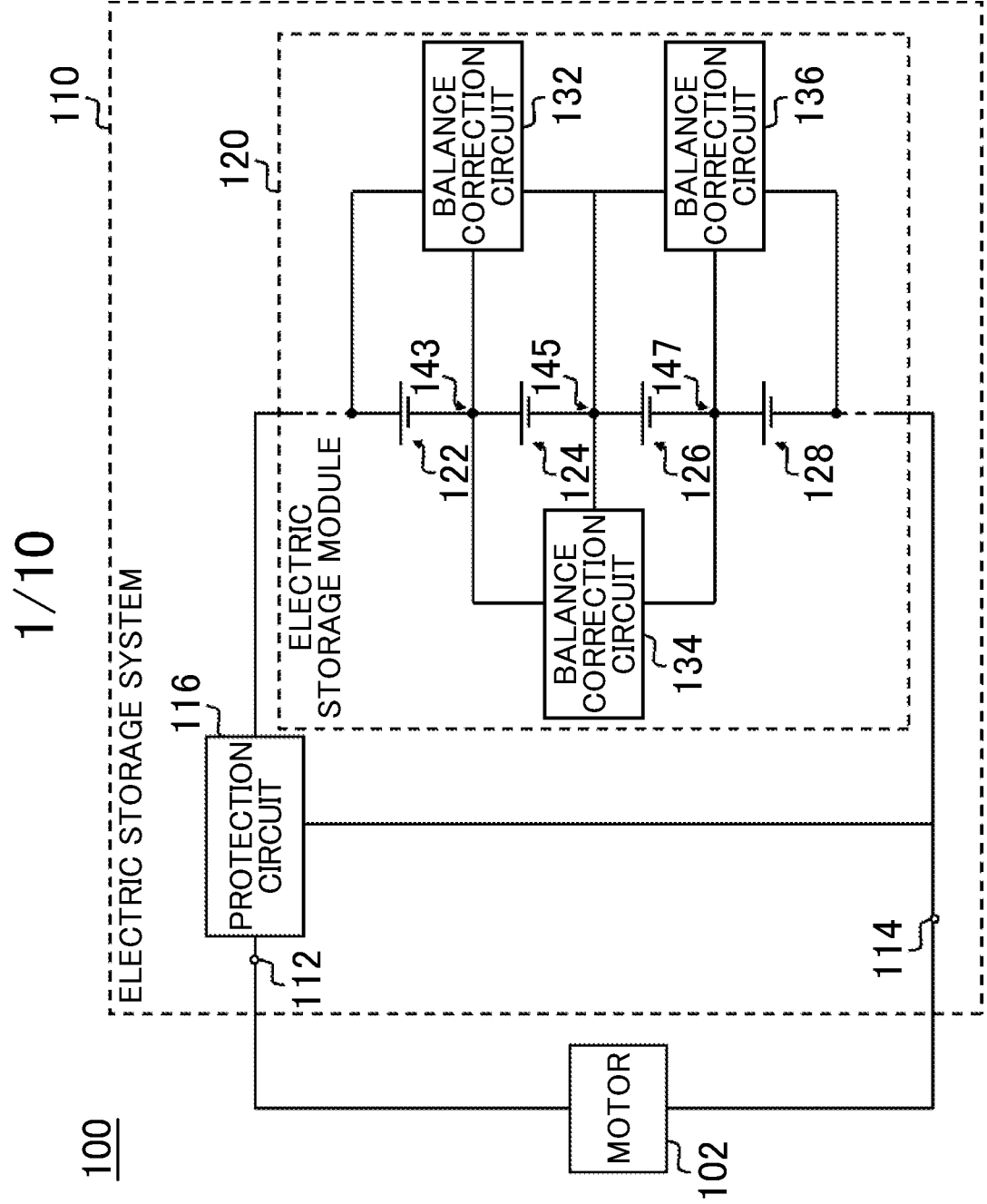
FIG. 1 schematically shows an example of an apparatus 100 including an electric storage system 110.

Hereinafter, some embodiments of the present invention will be described. The embodiments do not limit the invention according to the claims, and all the combinations of the features described in the embodiments are not necessarily essential to means provided by aspects of the invention. In addition, the embodiments are described with reference to the drawings. In the drawings, the same or similar portions are assigned the same reference numeral, and overlapping explanation may be occasionally omitted.

FIG. 1 schematically shows an example of an apparatus 100 including an electric storage system 110. With reference to FIG. 1, the configuration and operation of the apparatus 100 and the electric storage system 110 are explained. In the present embodiment, the apparatus 100 includes a motor 102 and an electric storage system 110. The apparatus 100 may be a transport apparatus such as an electric automobile, a hybrid automobile, an electric two wheeled vehicle, a rail vehicle, and an elevator. The apparatus 100 may be an electric appliance such as a personal computer and a portable telephone. The motor 102 is electrically connected to the electric storage system 110, and uses power supplied by the electric storage system 110. The motor 102 may be used as a regenerative brake. The motor 102 may be an example of an electric load.

The electric storage system 110 is electrically connected to the motor 102, to supply power to the motor 102 (occasionally referred to as "discharge of the electric storage system"). The electric storage system 110 is electrically connected to a charge apparatus not illustrated in the drawings, to store electric energy (occasionally referred to as "charge of the electric storage system").

The electric storage system 110 includes a terminal 112, a terminal 114, a protection circuit 116, and an electric storage module 120. The electric storage module 120 may include a plurality of electric storage cells and a plurality of balance correction circuits. The plurality of electric storage cells are serially connected and include an electric storage cell 122, an electric storage cell 124, an electric storage cell 126, and an electric storage cell 128. The plurality of balance correction circuits include a balance correction circuit 132, a balance correction circuit 134, and a balance correction circuit 136. The balance correction circuit 132, the balance correction circuit 134, and the balance correction circuit 136 may be an example of a balance correction apparatus.

In this specification, the term "electrically connected" is not limited to describe a concept that an element and another element are in direct connection. The term also includes a concept that an element and another element are connected with a third element therebetween. In addition, the term is not limited to describe such a concept that an element and another element are physically connected to each other. For example, an input coil and an output coil of a transformer, although not physically connected to each other, are electrically connected to each other. Furthermore, this term is not limited to describe such a concept that an element and another element are actually being electrically connected to each other; it can also be used to describe such a concept that an element and another element are brought into electrical connection to each other when the electric storage cell and the balance correction circuit are electrically connected to each other. The term "connected in series" indicates that an element and another element are electrically connected in series. In addition, unless otherwise specifically stated, "voltage difference" between electric storage cells indicates a value obtained by comparing voltages of two electric storage cells (occasionally referred to as "inter-terminal voltage"), and subtracting a voltage of an electric storage cell having a lower voltage from a voltage of an electric storage cell having a higher voltage.

The terminal 112 and the terminal 114 electrically connect an apparatus (e.g., the motor 102, charge apparatus) outside the system, to an electric storage system 110. The protection circuit 116 protects the electric storage module 120 from at least one of excess current, excess voltage, and excess discharge. An example of the protection circuit 116 is a known excess current/excess voltage protection circuit such as disclosed in Japanese Patent Application Publication No. 2009-183141.

The electric storage cell 122, the electric storage cell 124, the electric storage cell 126, and the electric storage cell 128 are connected to each other in series. The electric storage cell 122, the electric storage cell 124, the electric storage cell 126, and the electric storage cell 128 may be a secondary battery or a capacitor. The electric storage cell 122, the electric storage cell 124, the electric storage cell 126, and the electric storage cell 128 may be a lithium ion battery. Each of the electric storage cell 122, the electric storage cell 124, the electric storage cell 126, and the electric storage cell 128 may further include a plurality of electric storage cells.

The balance correction circuit 132 equalizes the voltage between the electric storage cell 122 and the electric storage cell 124. The balance correction circuit 132 is electrically connected to an end of the electric storage cell 122 nearer the terminal 112 (occasionally referred to as "positive pole side"), as well as to a connection point 143 between an end of the electric storage cell 122 nearer the terminal 114 (occasionally referred to as "negative pole side") and the positive pole side of the electric storage cell 124. The balance correction circuit 132 is electrically connected to a connection point 145 between the negative pole side of the electric storage cell 124 and the positive pole side of the electric storage cell 126.

Although not illustrated in the drawings, in one embodiment, the balance correction circuit 132 may include an inductor (not illustrated in the drawings) electrically connected to the connection point 143. By electrically connecting the balance correction circuit 132, the electric storage cell 122, and the electric storage cell 124 as described above, a first circuit including the electric storage cell 122 and the inductor and a second circuit including the electric storage cell 124 and the inductor are formed. The balance correction circuit 132 runs current to the first circuit and the second circuit alternately. Accordingly, electric energy can be exchanged between the electric storage cell 122 and the electric storage cell 124 via the inductor. As a result, the voltage can be equalized between the electric storage cell 122 and the electric storage cell 124.

The balance correction circuit 134 equalizes the voltage between the electric storage cell 124 and the electric storage cell 126. The balance correction circuit 134 is electrically connected to the connection point 143, the connection point 145, and a connection point 147 between the negative pole side of the electric storage cell 126 and the positive pole side of the electric storage cell 128. The balance correction circuit 136 equalizes the voltage between the electric storage cell 126 and the electric storage cell 128. The balance correction circuit 136 is electrically connected to the connection point 145, the connection point 147, and the negative pole side of the electric storage cell 128. The balance correction circuit 134 and the balance correction circuit 136 may have a configuration similar to that of the balance correction circuit 132.

As stated above, according to the electric storage module 120 according to the present embodiment, even when there is variation caused between voltage of a plurality of electric storage cells, the balance correction circuit operates to equalize the voltage of the plurality of electric storage cells. As a result, the utilization efficiency of the electric storage system 110 can improve.

For example, when the electric storage cell 122 and the electric storage cell 124 have different manufacturing quality, deterioration degree or the like from each other, the electric storage cell 122 and the electric storage cell 124 may have different battery characteristics from each other. Some examples of the battery characteristics are battery capacity, and a discharge voltage characteristic that represents the relation between the battery voltage and the discharge time. For example, as an electric storage cell deteriorates, the battery voltage will drop within a shorter discharge time.

When the batter characteristics of the electric storage cell 122 and the electric storage cell 124 are different from each other, even though the voltage therebetween was substantially the same at the charge completion of the electric storage system 110, the electric storage cell 122 and the electric storage cell 124 will have voltage different from each other, as the electric storage system 110 discharges. In addition, even though the electric storage cell 122 and the electric storage cell 124 had substantially the same voltage at the beginning of charging the electric storage system 110, the voltage for the electric storage cell 122 and the electric storage cell 124 will differ from each other as the electric storage system 110 is charged.

The electric storage cell 122 and the electric storage cell 124 have a predetermined range of available charge level (occasionally referred to as "State of Charge: SOC"), and so if there is difference in voltage between the electric storage cell 122 and the electric storage cell 124, the utilization efficiency of the electric storage system 110 deteriorates. However, according to the electric storage module 120 of the present embodiment, the electric storage system 110 will have an improved utilization efficiency by equalizing the voltage between the electric storage cell 122 and the electric storage cell 124.

Figure 2:
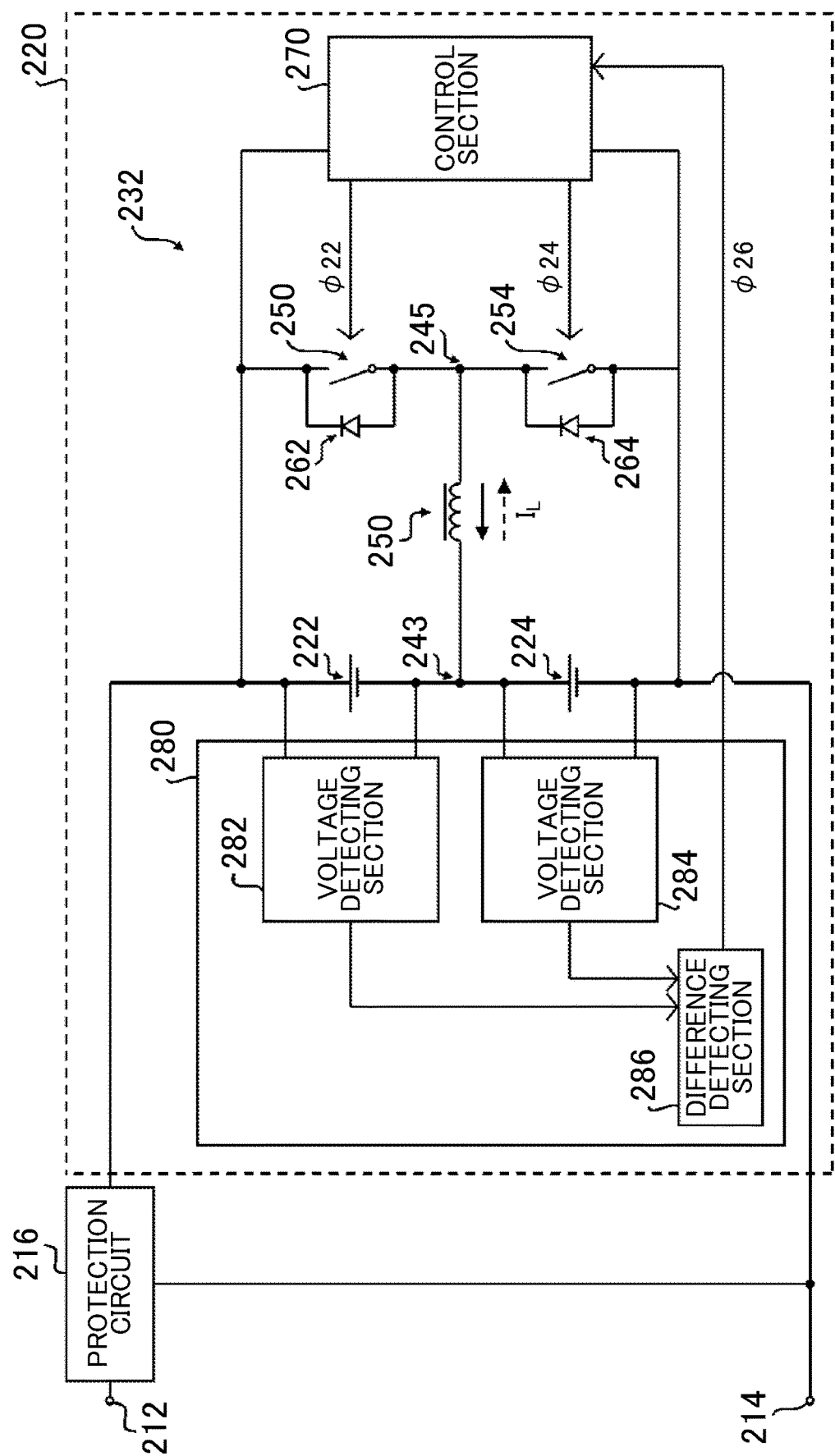
FIG. 2 schematically shows an example of an electric storage system 210.
Figure 3:
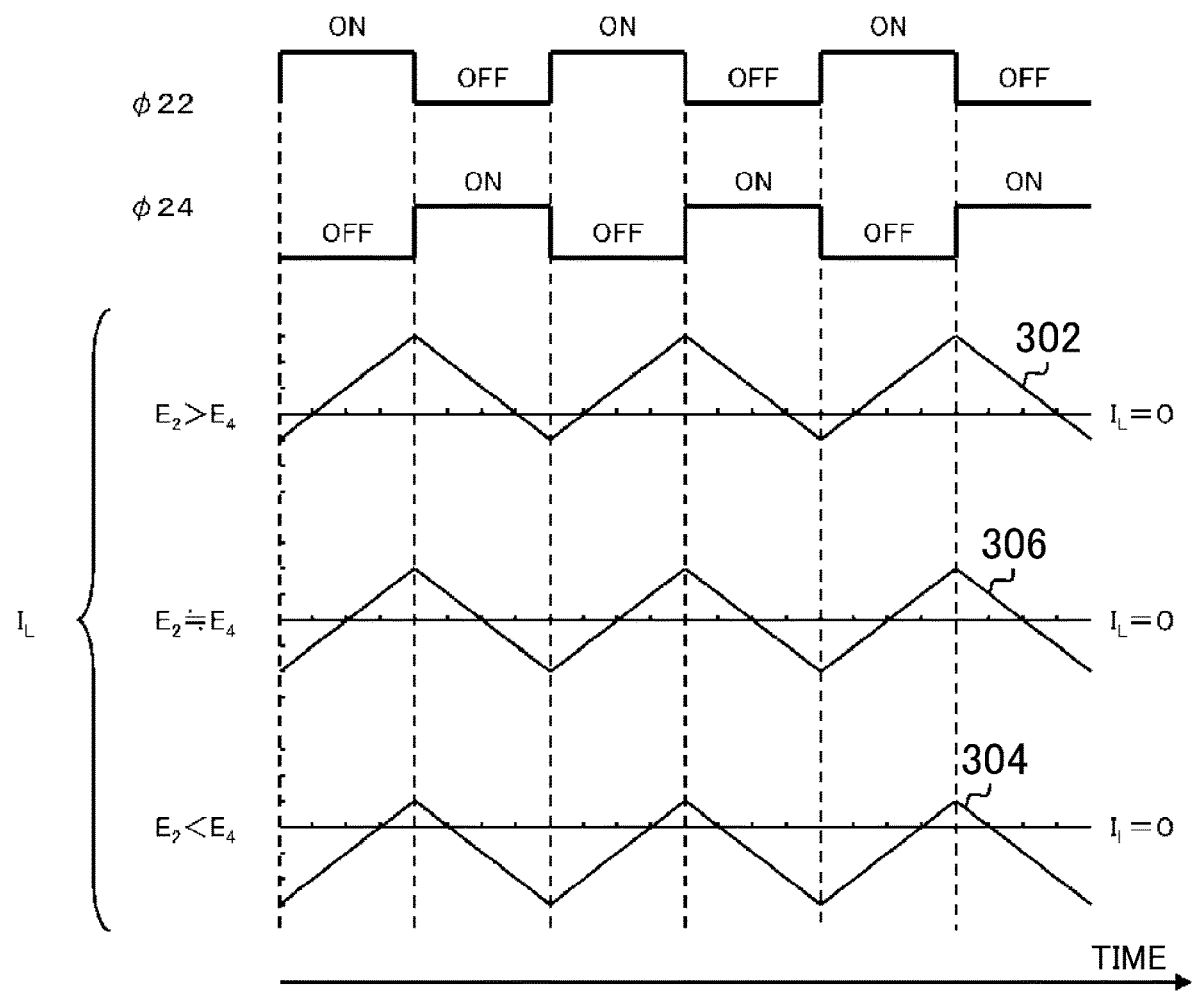
FIG. 3 schematically shows an example of an operation of the electric storage system 210.

FIG. 2 schematically shows an example of an electric storage system 210. FIG. 3 schematically shows an example of an operation of the electric storage system 210. The configuration and operation of the balance correction circuit are explained below with reference to FIG. 2 and FIG. 3. Note that the electric storage system 210 shown in FIG. 2 and FIG. 3 has two electric storage cells, so as to simplify the explanation. However, those skilled in the art reading the description concerning the electric storage system 210 having two electric storage cells can configure and use an electric storage system 210 having a plurality of electric storage cells and a plurality of balance correction circuits. The electric storage cell 222 and the electric storage cell 224 may be an example of two electric storage cells provided to be adjacent to each other, among the plurality of electric storage cells connected in series.

In the present embodiment, the electric storage system 210 includes a terminal 212, a terminal 214, a protection circuit 216, and an electric storage module 220. The electric storage module 220 includes an electric storage cell 222 and an electric storage cell 224 connected in series, and a balance correction circuit 232 for equalizing the voltage of the electric storage cell 222 and the electric storage cell 224.

The balance correction circuit 232 may include an inductor 250, a switching device 252, a switching device 254, a diode 262, a diode 264, a control section 270, and a voltage monitoring section 280. The voltage monitoring section 280 may include a voltage detecting section 282, a voltage detecting section 284, and a difference detecting section 286.

The electric storage cell 222 may be one example of a first electric storage cell. The electric storage cell 224 may be one example of a second electric storage cell. The balance correction circuit 232 may be one example of a balance correction apparatus. The inductor 250 may be one example of a voltage adjusting section. The switching device 252 may be one example of a first switching device. The switching device 254 may be one example of a second switching device.

The terminal 212 and the terminal 214 may have a configuration similar to that of the terminal 112 and that of the terminal 114, respectively. The protection circuit 216 may have a configuration similar to that of the protection circuit 116. The electric storage cell 222 and the electric storage cell 224 may have a configuration similar to that of the electric storage cell 122, the electric storage cell 124, the electric storage cell 126, or the electric storage cell 128. In the description of the electric storage system 210, the configuration similar to that of each element of the electric storage system 110 may be occasionally omitted. Also in FIG. 1, the electric storage system 110 may have a configuration similar to that of the electric storage system 210. The balance correction circuit 132, the balance correction circuit 134, and the balance correction circuit 136 may have a configuration similar to that of the balance correction circuit 232.

In the present embodiment, the balance correction circuit 232 is electrically connected to the positive pole side of the electric storage cell 222 to a connection point 243 between the negative pole side of the electric storage cell 222 and the positive pole side of the electric storage cell 224, and to the negative pole side of the electric storage cell 224. As a result, a first open/close circuit is formed, which includes the electric storage cell 222, the switching device 252, and the inductor 250. In addition, a second open/close circuit is formed, which includes the electric storage cell 224, the inductor 250, and the switching device 254. The connection point 243 may be an example of a connection point between an end of the first electric storage cell and an end of the second electric storage cell.

The inductor 250 is connected in series to the electric storage cell 222 and the switching device 252 between the electric storage cell 222 and the switching device 252, and adjusts the voltage of at least one of the electric storage cell 222 and the electric storage cell 224. In the present embodiment, an end of the inductor 250 is electrically connected to the connection point 243. The other end of the inductor 250 is electrically connected to a connection point 245 between the switching device 252 and the switching device 254.

By alternating the ON operation and OFF operation (occasionally referred to as "ON/OFF operation") between the switching device 252 and the switching device 254, an inductor current $I_L$ will be generated in the inductor 250. Accordingly, electric energy can be exchanged between the electric storage cell 122 and the electric storage cell 124 via the inductor. As a result, the voltages of the electric storage cell 122 and the electric storage cell 124 can be equalized.

The switching device 252 is electrically connected between the other end of the inductor 250 and the positive pole side of the electric storage cell 222. The switching device 252 receives a control signal $\varphi22$ from the control section 270, and performs an ON operation or an OFF operation based on this control signal $\varphi22$. This opens or closes the first open/close circuit. The switching device 252 may be a MOSFET.

The switching device 254 is electrically connected between the other end of the inductor 250 and the negative pole side of the electric storage cell 224. The switching device 254 receives a control signal $\varphi24$ from the control section 270, and performs an ON operation or an OFF operation based on this control signal $\varphi24$. This opens or closes the second open/close circuit. The switching device 254 may be a MOSFET.

The diode 262 is formed in parallel with the switching device 252, and runs a current from the other end of the inductor 250 towards the positive pole side of the electric storage cell 222. The diode 264 is formed in parallel with the switching device 254, and runs a current from the negative pole side of the electric storage cell 224 towards the other end of the inductor 250. The diode 262 and the diode 264 may be a parasitic diode formed equivalently between the source and the drain of the MOSFET.

By providing the diode 262 and the diode 264, even in a case in which the inductor current $I_L$ remains during a period in which both of the switching device 252 and the switching device 254 are brought to the OFF state, the inductor current $I_L$ can continue running through the diode 262 and the diode 264. This improves the utilization rate of the inductor current $I_L$ generated in the inductor 250. This can also prevent surge voltage from occurring, which would occur when the inductor current $I_L$ is interrupted.

The control section 270 supplies a control signal $\varphi22$ for controlling ON/OFF operation of the switching device 252, to the switching device 252. The control section 270 supplies a control signal $\varphi24$ for controlling ON/OFF operation of the switching device 254, to the switching device 254. The control signal $\varphi22$ may be one example of a first control signal. The control signal $\varphi24$ may be one example of a second control signal.

In the present embodiment, the control section 270 receives a signal $\varphi26$ including information related to the voltage of the electric storage cell 222 and the voltage of the electric storage cell 224 from the voltage monitoring section 280, and causes the control signals $\varphi22$ and $\varphi24$ to be generated based on the signal $\varphi26$. The control section 270 may be formed on a same substrate on which the switching device 252 and the switching device 254 are formed.

The control section 270 may generate control signals $\varphi22$ and $\varphi24$ by means of a pulse generator generating pulse arrays of a predetermined period. The pulse generator may be a variable pulse generator performing variable control of a duty ratio of at least one of the control signals $\varphi22$ and $\varphi24$. The duty ratio can be calculated as a ratio of ON period to a period of a square wave.

The control section 270 may supply control signals $\varphi22$ and $\varphi24$ so that the switching device 252 and the switching device 254 repeat ON/OFF operations alternately. Accordingly, a switching operation to alternately switch between the state in which a current flows through the first open/close circuit and the state in which a current flows through the second open/close circuit is repeated.

The control section 270 may supply control signals φ22 and φ24 so that the balance correction circuit 232 repeats a switching operation at a predetermined period. Here, "a predetermined period" not only includes a case in which the period of repetition of the switching operation is pre-set, but also includes a case in which the period is fluctuated by means of a certain control. For example, it includes a case in which the period of the next cycle is determined based on a certain algorithm.

The switching operation may include a first operation in which one of the switching device 252 and the switching device 254 is operated to be ON and the other switching device is operated to be OFF, and a second operation in which the one of the switching device 252 and the switching device 254 is operated to be OFF, and the other switching device is operated to be ON. The switching operation may include a third operation in which both of the switching device 252 and the switching device 254 are operated to be OFF in addition to the first operation and the second operation. The order of the first operation, the second operation, and the third operation may be determined arbitrarily. However, it is preferable that the second operation is performed subsequent to the first operation. The switching operation may include other operations, too.

The control section 270 controls the balance correction circuit 232 so that the balance correction circuit 232 repeats a switching operation in the operational state of the balance correction circuit 232. The control section 270 controls the balance correction circuit 232 so that the balance correction circuit 232 stops the switching operation in the state in which the balance correction circuit 232 is stopped ("stop state").

The control section 270 determines a timing at which the balance correction circuit 232 is stopped. The control section 270 may determine the timing at which the balance correction circuit 232 is stopped based on the voltage of the electric storage cell 222 and the voltage of the electric storage cell 224.

The first embodiment in which the timing for stopping the balance correction circuit 232 is determined based on the voltage of the electric storage cell 222 and the voltage of the electric storage cell 224 is exemplified as follows. In this embodiment, the control section 270 obtains information representing the voltage difference between the electric storage cell 222 and the electric storage cell 224 by receiving a signal φ26 from the voltage monitoring section 280. When the voltage difference between the electric storage cell 222 and the electric storage cell 224 is equal to a predetermined value or smaller than the predetermined value, the control section 270 supplies the control signals φ22 and φ24 to operate both of the switching device 252 and the switching device 254 to be OFF, thereby stopping the balance correction circuit 232.

Accordingly, the balance correction circuit 232 can be stopped in the state in which equalization of the electric storage cell 222 and the electric storage cell 224 is substantially ended. As a result, the hunting of the balance correction circuit 232 can be prevented, thereby restraining the consumption power of the balance correction circuit 232.

The second embodiment in which the timing for stopping the balance correction circuit 232 is determined based on the voltage of the electric storage cell 222 and the voltage of the electric storage cell 224 is exemplified as follows. In this embodiment, the control section 270 supplies control signals φ22 and φ24 so that the ON time of the switching device corresponding to the electric storage cell of the electric storage cell 222 and the electric storage cell 224 which has a higher voltage is longer than the ON time of the switching device corresponding to the electric storage cell having a lower voltage. Just as the first embodiment, when the voltage difference between the electric storage cell 222 and the electric storage cell 224 is equal to a predetermined value or smaller than the predetermined value, the control section 270 stops the balance correction circuit 232. According to the present embodiment, The balance correction circuit 232 can be stopped in the state in which the voltage difference between the electric storage cell 222 and the electric storage cell 224 has become extremely small.

When the voltage of the electric storage cell 222 is higher than the voltage of the electric storage cell 224, in an embodiment, the control section 270 supplies the control signals φ22 and φ24 so that the ON time of the switching device 252 is longer than the ON time of the switching device 254 during a time period after the switching operation is started by the balance correction circuit 232 until it is stopped. For example, when the voltage of the electric storage cell 222 is higher than the voltage of the electric storage cell 224 at the time of start of the switching operation of the balance correction circuit 232, the control section 270 supplies the control signals φ22 and φ24 so that the ON time of the switching device 252 is longer than the ON time of the switching device 254 until the balance correction circuit 232 is stopped.

In another embodiment, the control section 270 supplies the control signals φ22 and φ24 so that the ON time of the switching device 252 is equal to the ON time of the switching device 254, after start of the switching operation by the balance correction circuit 232 until the voltage difference between the electric storage cell 222 and the electric storage cell 224 becomes a predetermined value. Thereafter and until the switching operation by the balance correction circuit 232 is stopped, the control signals φ22 and φ24 are supplied so that the ON time of the switching device 252 is longer than the ON time of the switching device 254.

Likewise, when the voltage of the electric storage cell 222 is smaller than the voltage of the electric storage cell 224, the control section 270 may supply the control signals φ22 and φ24 so that the ON time of the switching device 254 is longer than the ON time of the switching device 252. For example, when the voltage of the electric storage cell 222 is smaller than the voltage of the electric storage cell 224 at the time at which the switching operation of the balance correction circuit 232 is started, the control section 270 supplies the control signals φ22 and φ24 so that the ON time of the switching device 254 is longer than the ON time of the switching device 252, until the balance correction circuit 232 is stopped.

In another embodiment, the control section 270 supplies the control signals φ22 and φ24 so that the ON time of the switching device 252 is equal to the ON time of the switching device 254 until the voltage difference between the electric storage cell 222 and the electric storage cell 224 becomes a predetermined value. Thereafter and until the switching operation by the balance correction circuit 232 is stopped, the control signals φ22 and φ24 may be supplied so that the ON time of the switching device 254 is longer than the ON time of the switching device 252.

So as to equalize the voltages of the electric storage cell 222 and the electric storage cell 224, those skilled in the art would normally try to control the control signals φ22 and φ24 so that the ON time of the switching device 252 is equal to the ON time of the switching device 254. However, due to the accuracy with which the switching device 252, the switching device 254, and the balance correction circuit 232 are manufactured and the manufacturing error thereof or the like, it is difficult to cause the ON time of the switching device 252 to match the ON time of the switching device 254 with accuracy.

Therefore, it is difficult to equalize the voltage of the electric storage cell 222 and the voltage of the electric storage cell 224 with accuracy by controlling the control signals φ22 and φ24 so that the ON time of the switching device 252 is equal to the ON time of the switching device 254. However, even when the voltage difference between two adjacent electric storage cells is small, as the number of electric storage cells included in an electric storage system increases, the voltage difference between two adjacent electric storage cells will build up, to make it hard to be ignored as a system on the whole.

As opposed to this, according to the present embodiment, for example when the voltage of the electric storage cell 222 is higher than the voltage of the electric storage cell 224, the control section 270 supplies the control signals φ22 and φ24 so that the ON time of the switching device 252 becomes longer than the ON time of the switching device 254. Therefore, if the balance correction circuit 232 continues operating, the voltage of the electric storage cell 222 will be smaller than the voltage of the electric storage cell 224, thereby reversing the magnitude relation of the voltage of the electric storage cell 222 and the voltage of the electric storage cell 224.

By stopping the balance correction circuit 232 at a timing closer to the timing at which the magnitude relation of the voltage of the electric storage cell 222 and the voltage of the electric storage cell 224 is reversed, the balance correction circuit 232 can be stopped at a timing at which the voltage difference between the electric storage cell 222 and the electric storage cell 224 is 0 or at a timing at which the voltage difference is extremely small. For example, the control section 270 stops the balance correction circuit 232 when the voltage difference between the electric storage cell 222 and the electric storage cell 224 becomes equal to a predetermined value or smaller than the predetermined value.

According to the present embodiment, compared to the case in which the control signals φ22 and φ24 are controlled to cause the ON time of the switching device 252 is equal to the ON time of the switching device 254, the timing at which the voltage difference between the electric storage cell 222 and the electric storage cell 224 is 0 can be created with more certainty. Accordingly, the accuracy with which the voltage of the electric storage cell 222 is equalized to the voltage of the electric storage cell 224 can improve. As a result, the hunting of the balance correction circuit 232 can be prevented, to restrain the consumption power of the balance correction circuit 232.

In a preferred embodiment, after the magnitude relation between the voltage of the electric storage cell 222 and the voltage of the electric storage cell 224 is reversed, when the absolute value of the voltage difference between the electric storage cell 222 and the electric storage cell 224 becomes equal to or smaller than a first threshold value while the balance correction circuit 232 is operated, the control section 270 supplies the control signal φ22 to operate at least the switching device 252 to be OFF, thereby stopping the balance correction circuit 232. More specifically, the control section 270 may stop the balance correction circuit 232, by supplying the control signals φ22 and φ24 so that both of the switching device 252 and the switching device 254 are operated to be OFF.

According to the present embodiment, the balance correction circuit 232 is stopped after the magnitude relation between the voltage of the electric storage cell 222 and the voltage of the electric storage cell 224 is reversed. Accordingly, the absolute value of the voltage difference between the electric storage cell 222 and the electric storage cell 224 after the balance correction circuit 232 is stopped can be smaller. In addition, it becomes possible to more effectively prevent hunting of the balanced correction circuit 232.

For example, when the voltage of the electric storage cell 222 is higher than the voltage of the electric storage cell 224, after the balance correction circuit 232 is stopped, the measured value of the voltage of the electric storage cell 222 will increase due to the voltage fall due to internal resistance of the electric storage cell 222 or the like (this may be occasionally referred to as apparent voltage fluctuation). On the other hand, the measured value of the voltage of the electric storage cell 224 will decrease due to the voltage fall due to internal resistance of the electric storage cell 224 or the like (this may be occasionally referred to as apparent voltage fluctuation).

Therefore, if the balance correction circuit 232 is stopped before reversal of the magnitude relation between the voltage of the electric storage cell 222 and the voltage of the electric storage cell 224, the absolute value of the voltage difference between the electric storage cell 222 and the electric storage cell 224 will increase as time goes by after the balance correction circuit 232 is stopped. In contrast, if the balance correction circuit 232 is stopped after reversal of the magnitude relation between the voltage of the electric storage cell 222 and the voltage of the electric storage cell 224, the absolute value of the voltage difference between the electric storage cell 222 and the electric storage cell 224 will decrease as time goes by after the balance correction circuit 232 is stopped. As a result, the absolute value of the voltage difference between the electric storage cell 222 and the electric storage cell 224 can be smaller after the balance correction circuit 232 is stopped.

The first threshold value may be determined taking into consideration the apparent voltage fluctuation of the electric storage cell 222 that would be caused when the balance correction circuit 232 is stopped. The first threshold value may be determined based on the current value of the inductor 250 and the value of the direct current resistance (occasionally referred to as DCR) of the electric storage cell 222. Assuming the direct current resistance value of the electric storage cell 222 and the direct current resistance value of the electric storage cell 224 are substantially the same, the first threshold value can be determined by multiplying the current value of the inductor 250 by the direct current resistance value of the electric storage cell 222.

The first threshold value may be determined taking into consideration the apparent voltage fluctuation of the electric storage cell 222 and the electric storage cell 224 that would be caused when the balance correction circuit 232 is stopped. The first threshold value may be determined based on the current value of the inductor 250, the value of the direct current resistance of the electric storage cell 222, and the value of the direct current resistance of the electric storage cell 224. The first threshold value may be determined by multiplying the summation of the direct current resistance value of the electric storage cell 222 and the direct current resistance value of the electric storage cell 224 by the average current value of the inductor 250 and by dividing the result by 2.

The direct current resistance value of the electric storage cell 222 changes according to the temperature and deterioration condition of the electric storage cell 222. In view of this, the first threshold value may be determined by taking into consideration at least one of the temperature and the deterioration condition of the electric storage cell 222. The direct current resistance value of the electric storage cell 224 changes according to the temperature and deterioration condition of the electric storage cell 224. In view of this, the first threshold value may be determined by taking into consideration at least one of the temperature and the deterioration condition of the electric storage cell 224.

For example, the first threshold value is determined by using the value obtained by multiplying, by a predetermined factor, the direct current resistance value of the electric storage cell 222 and the electric storage cell 224 at the time of shipping taking into consideration the deterioration condition of the electric storage cell 222 and the electric storage cell 224. The predetermined factor may be equal to or greater than 1 and equal to or smaller than 3. Preferably, the predetermined factor may be equal to or greater than 1 and equal to or smaller than 2.

The first threshold value may be determined so that the absolute value of the voltage difference between the electric storage cell 222 and the electric storage cell 224 is equal to or smaller than the second threshold value when a predetermined time has passed after stop of the balance correction circuit 232 assuming that the stop state of the balance correction circuit 232 is maintained after the control section 270 has stopped the balance correction circuit 232. The absolute value of the second threshold value may be smaller than the absolute value of the first threshold value. The predetermined time may be determined taking into consideration at least one of the fluctuation width of the voltage fluctuation due to the voltage fall and the duration of the voltage fluctuation.

The above-mentioned predetermined time may be a time until the fluctuation width of the voltage fluctuation due to the voltage fall reaches 60% of the final fluctuation width at the time when the voltage fluctuation has substantially ended (preferably 75%, or more preferably 80%). Note that the voltage fluctuation due to voltage fall normally ends in about 30 minutes or one hour. The predetermined time may be in a range equal to or above 0.5 second and equal to or below 5 minutes. The predetermined time may preferably be in a range equal to or above 1 second and equal to or below 2 minutes, and more preferably in a range equal to or above 1 second and equal to or below 1 minute.

The first threshold value may be equal to or above 0.5 mV and equal to or below 100 mV. The first threshold value is preferably equal to or above 0.5 mV and equal to or below 10 mV, and more preferably equal to or above 0.5 mV and equal to or below 5 mV. In the normal usage state, by setting the first threshold value in the above-stated range, the absolute value of the voltage difference between the electric storage cell 222 and the electric storage cell 224 when the voltage fluctuation due to voltage fall is substantially ended can be smaller than the absolute value of the voltage difference between the electric storage cell 222 and the electric storage cell 224 when the balance correction circuit 232 is stopped. As a result, the accuracy with which the balance correction circuit 232 is equalized can be improved. In addition, the hunting of the balance correction circuit 232 can be restrained.

After the balance correction circuit 232 is stopped, when the absolute value of the voltage difference between the electric storage cell 222 and the electric storage cell 224 in the stop state of the balance correction circuit 232 is equal to the second threshold value or higher than the second threshold value, the control section 270 restarts the operation of the balance correction circuit 232 by supplying at least one of the control signals $\varphi 22$ and $\varphi 24$ to operate at least one of the switching device 252 and the switching device 254 to be ON. Accordingly, the balance correction circuit 232 is brought into an operational state, which results in repetition of the switching operation including at least the first operation and the second operation.

After the balance correction circuit 232 is stopped, the control section 270 may preferably stop the balance correction circuit 232 for a predetermined time. In the present embodiment, the control section 270 does not restart the operation of the balance correction circuit 232 if the above-stated predetermined time has not elapsed, even when the absolute value of the voltage difference between the electric storage cell 222 and the electric storage cell 224 has become equal to or greater than the second threshold value in the stop state of the balance correction circuit 232 after the balance correction circuit 232 is stopped. Accordingly, hunting of the balance correction circuit 232 can be more effectively prevented. The above-stated predetermined time may be in a range equal to or above 0.5 second and equal to or below 5 minutes. The predetermined time may preferably be in a range equal to or above 1 second and equal to or below 2 minutes, and more preferably in a range equal to or above 1 second and equal to or below 1 minute.

Note that in the present embodiment, an example is explained in which, after the balance correction circuit 232 is stopped, the control section 270 restarts the operation of the balance correction circuit 232 when the absolute value of the voltage difference between the electric storage cell 222 and the electric storage cell 224 in the stop state of the balance correction circuit 232 is equal to or greater than the second threshold value. However, the control section 270 is not limited to the present embodiment. The control section 270 may restart the operation of the balance correction circuit 232 after the balance correction circuit 232 is stopped, when the absolute value of the voltage difference between the electric storage cell 222 and the electric storage cell 224 in the stop state of the balance correction circuit 232 has become equal to or greater than a third threshold value. The third threshold value may be greater than the second threshold value and smaller than the first threshold value.

The voltage monitoring section 280 monitors the voltage of the electric storage cell 222 and the voltage of the electric storage cell 224. In the present embodiment, the voltage monitoring section 280 detects the voltage of the electric storage cell 222 and the voltage of the electric storage cell 224 by the voltage detecting section 282 and the voltage detecting section 284. The voltage monitoring section 280 detects the voltage difference between the electric storage cell 222 and the electric storage cell 224 by inputting the voltage of the electric storage cell 222 and the voltage of the electric storage cell 224 to the difference detecting section 286. The voltage monitoring section 280 generates a signal $\varphi 26$ representing the detected voltage difference, and transmits it to the control section 270. The signal $\varphi 26$ may include information showing which one of the voltage of the electric storage cell 222 and the voltage of the electric storage cell 224 is higher.

The third embodiment in which the timing for stopping the balance correction circuit 232 is determined based on the voltage of the electric storage cell 222 and the voltage of the electric storage cell 224 is exemplified as follows. In the present embodiment, the switching operation includes the first operation, the second operation, and the third operation. In the present embodiment, the control section 270 supplies the control signals φ22 and φ24 so that the smaller the voltage difference between the electric storage cell 222 and the electric storage cell 224, the ratio of the time of the third operation to the period of the switching operation becomes higher.

The control section 270 may determine the time of the third operation according to a predetermined method based on the voltage difference between the electric storage cell 222 and the electric storage cell 224. At the operation start, the time of the third operation may be 0 second. The time of the first operation may be equal to the time of the second operation. The time of the first operation and the time of the second operation may be determined in the same manner as in the second embodiment.

In the present embodiment, the control section 270 supplies the control signals φ22 and φ24 so as to operate both of the switching device 252 and the switching device 254 to be OFF, when either the time of the third operation or the ratio of the time of the third operation to the period of the switching operation is equal to or greater than a predetermined value. Accordingly, the control section 270 can supply the control signals φ22 and φ24 so as to operate both of the switching device 252 and the switching device 254 to be OFF, when the voltage difference between the electric storage cell 222 and the electric storage cell 224 is equal to or smaller than a predetermined value.

According to the present embodiment, the control section 270 can stop the balance correction circuit 232 at a timing at which the voltage difference between the electric storage cell 222 and the electric storage cell 224 has become sufficiently small. As a result, the hunting of the balance correction circuit 232 can be prevented, to restrain consumption power of the balance correction circuit 232.

The fourth embodiment in which the timing for stopping the balance correction circuit 232 is determined based on the voltage of the electric storage cell 222 and the voltage of the electric storage cell 224 is exemplified as follows. In the present embodiment, the control section 270 supplies the control signals φ22 and φ24 so that the smaller the voltage difference between the electric storage cell 222 and the electric storage cell 224, the period of the switching operation becomes shorter.

The control section 270 may determine the period of the switching operation according to a predetermined method based on the voltage difference between the electric storage cell 222 and the electric storage cell 224. The time of the first operation may be equal to the time of the second operation. The time of the first operation and the time of the second operation may be determined just as in the second embodiment. The switching operation may or may not include the third operation. The ratio of the time of the third operation to the period of the switching operation may be determined in the same manner as in the third embodiment.

In the present embodiment, the control section 270 supplies the control signals φ22 and φ24 so as to operate both of the switching device 252 and the switching device 254 to be OFF, when the period of the switching operation is equal to or smaller than a predetermined value. Accordingly, the control section 270 can supply the control signals φ22 and φ24 so as to operate both of the switching device 252 and the switching device 254 to be OFF, when the voltage difference between the electric storage cell 222 and the electric storage cell 224 is equal to or smaller than a predetermined value.

According to the present embodiment, the control section 270 can stop the balance correction circuit 232 at a timing at which the voltage difference between the electric storage cell 222 and the electric storage cell 224 has become sufficiently small. In addition, since the balance correction circuit 232 is stopped at the time at which the equalization ends, the consumption power of the balance correction circuit 232 can be restrained.

The voltage monitoring section 280 monitors the voltage of the electric storage cell 222 and the voltage of the electric storage cell 224. In the present embodiment, the voltage monitoring section 280 detects the voltage of the electric storage cell 222 and the voltage of the electric storage cell 224 by the voltage detecting section 282 and the voltage detecting section 284. The voltage monitoring section 280 detects the voltage difference between the electric storage cell 222 and the electric storage cell 224 by inputting the voltage of the electric storage cell 222 and the voltage of the electric storage cell 224 to the difference detecting section 286. The voltage monitoring section 280 generates a signal φ26 representing the detected voltage difference, and transmits it to the control section 270. The signal φ26 may include information showing which one of the voltage of the electric storage cell 222 and the voltage of the electric storage cell 224 is higher.

Next, with reference to FIG. 3, the principle of equalizing operation of the balance correction circuit 232 is explained. FIG. 3 shows a graph 302, a graph 304, and a graph 306, in correspondence with an example of a waveform of the control signal φ22 and φ24. The graph 302, the graph 304, and the graph 306 have a horizontal axis representing an elapse of time. The longitudinal axis thereof represents the magnitude of the inductor current $I_L$. The magnitude of the inductor current $I_L$ in FIG. 3 assumes that the current running in the direction from the connection point 245 towards the connection point 243 is positive (represented by the solid arrow in FIG. 2).

The graph 302 schematically shows an exemplary chronological change of the inductor current $I_L$ when the voltage $E_2$ of the electric storage cell 222 is higher than the voltage $E_4$ of the electric storage cell 224. The graph 304 schematically shows an exemplary chronological change of the inductor current $I_L$ when the voltage $E_2$ of the electric storage cell 222 is smaller than the voltage $E_4$ of the electric storage cell 224. The graph 306 schematically shows an exemplary chronological change of the inductor current $I_L$ when the voltage $E_2$ of the electric storage cell 222 is substantially the same as the voltage $E_4$ of the electric storage cell 224.

In FIG. 3, the control signals φ22 and φ24 each are a square wave having a duty ratio of 50%, so as to simplify the explanation. As shown in FIG. 3, the control signals φ22 and φ24 have logics or phase polarities complementary to each other so that one of the switching device 252 and the switching device 254 can be OFF while the other is ON.

As shown in FIG. 3, in the present embodiment, the switching device 252 is operated to be ON when the control signal φ22 is H logic, and is operated to be OFF when the control signal φ22 is L logic. The switching device 254 is operated to be ON when the control signal φ24 is H logic, and is operated to be OFF when the control signal φ24 is L logic.

As shown in the graph 302, when the voltage $E_2$ of the electric storage cell 222 is higher than the voltage $E_4$ of the electric storage cell 224, and when the switching device 252 is ON, the current runs along the current path from the positive polarity side of the electric storage cell 222, the switching device 252, the connection point 245, the inductor 250, the connection point 243, to the negative polarity side of the electric storage cell 222. In this example, the inductor 250 is charged with the inductor current $I_L$ in the direction shown by the solid arrow in FIG. 2.

Subsequently, the switching device 252 is brought to the OFF state, and the switching device 254 is brought to the ON state. Then, the inductor current $I_L$ charged in the inductor 250 is discharged along the current path from one end of the inductor 250, the connection point 243, the electric storage cell 224, the switching device 254, the connection point 245, to the other end of the inductor 250. This discharge is performed while charging the electric storage cell 224. As shown in FIG. 3, the inductor current $I_L$ decreases due to discharge as time goes by, and when the discharge current becomes 0, the inductor 250 will have flowing therein a charge current that is in a direction reverse to the discharge current.

As the graph 304 shows, when the voltage $E_2$ of the electric storage cell 222 is smaller than the voltage $E_4$ of the electric storage cell 224, and when the switching device 254 is ON, the current runs along the current path from the positive polarity side of the electric storage cell 224, the connection point 243, the inductor 250, the connection point 245, the switching device 254, to the negative polarity side of the electric storage cell 224. In this example, the inductor 250 is charged with the inductor current $I_L$ in the direction shown by the dotted arrow in FIG. 2.

Subsequently, the switching device 254 is brought to the OFF state, and the switching device 252 is brought to the ON state. Then, the inductor current $I_L$ charged in the inductor 250 is discharged along the current path from the other end of the inductor 250, the connection point 245, the switching device 252, the electric storage cell 222, the connection point 243, to the one end of the inductor 250. This discharge is performed while charging the electric storage cell 222.

As the graph 306 shows, when the voltage $E_2$ of the electric storage cell 222 is substantially the same as the voltage $E_4$ of the electric storage cell 224, during the period in which the switching device 252 or the switching device 254 is ON, discharge and charge of the inductor current $I_L$ is pursued substantially in the equal amount. As a result, the voltage can be maintained substantially balanced. However, note that even when the voltage is in the balanced state, if the balance correction circuit 232 is operated, the power will be consumed due to driving of the switching device 252 and the switching device 254.

As stated above, by the balance correction circuit 232 causing a current to flow to the first open/close circuit and the second open/close circuit alternately, electric energy can be exchanged between the electric storage cell 222 and the electric storage cell 224 via the inductor 250. As a result, the voltages of the electric storage cell 222 and the electric storage cell 224 can be equalized.

The present embodiment is based on the assumption that control signals φ22 and φ24 have a duty ratio of 50%, for making explanation simple. However, the control signals φ22 and φ24 are not limited to this configuration. In fact, the duty ratio of the control signals φ22 and φ24 can be changed according to the difference in voltage between the electric storage cell 222 and the electric storage cell 224.

Figure 4:
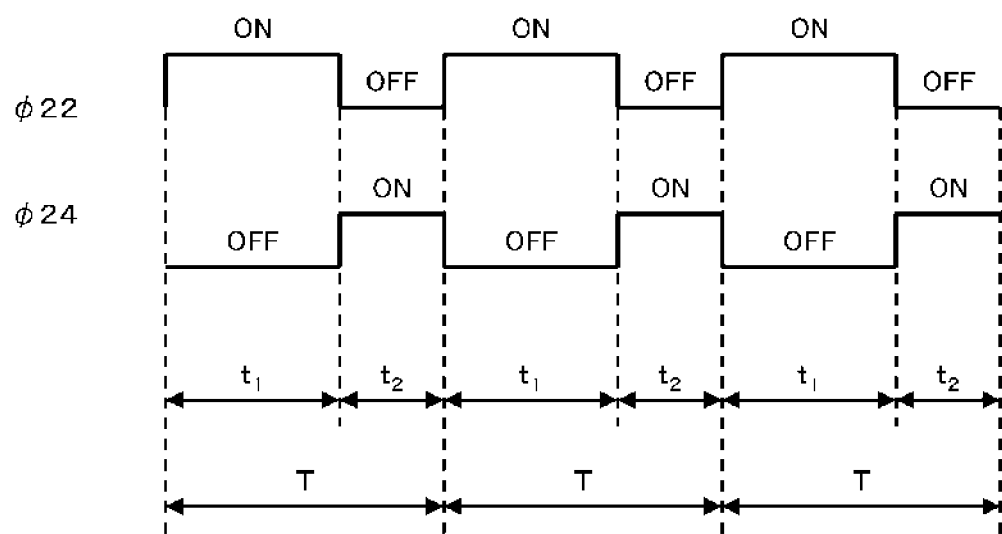
FIG. 4 schematically shows an example of the control signals $\varphi 22$ and $\varphi 24$.

FIG. 4 schematically shows one example of the control signals φ22 and φ24 according to the second embodiment for determining the timing at which the balance correction circuit 232 is stopped. In FIG. 4, the second embodiment for determining the timing at which the balance correction circuit 232 is stopped taking an example in which the voltage of the electric storage cell 222 is higher than the voltage of the electric storage cell 224.

In the present embodiment, the balance correction circuit 232 periodically repeats the switching operation including a first operation in which the switching device 252 is operated to be ON and the switching device 254 is operated to be OFF, and a second operation in which the switching device 252 is operated to be OFF and the switching device 254 is operated to be ON. In FIG. 4, T represents a period of a switching operation, and $t_1$ and $t_2$ respectively represent a time of the first operation and a time of the second operation.

As shown in FIG. 4, in the present embodiment, the switching device 252 is operated to be ON when the control signal φ22 is H logic, and is operated to be OFF when the control signal φ22 is L logic. The switching device 254 is operated to be ON when the control signal φ24 is H logic, and is operated to be OFF when the control signal φ24 is L logic.

In the present embodiment, because the voltage of the electric storage cell 222 is higher than the voltage of the electric storage cell 224, the control section 270 adjusts the duty ratio of the control signals φ22 and φ24 so that $t_1 > t_2$. Accordingly, the balance correction circuit 232 attempts to adjust both of the voltage of the electric storage cell 222 and the voltage of the electric storage cell 224 so that the voltage of the electric storage cell 222 becomes smaller than the voltage of the electric storage cell 224 in the steady state.

For this reason, while the balance correction circuit 232 repeats the switching operation, the electric storage cell 222 and the electric storage cell 224 transition from the state in which the voltage of the electric storage cell 222 is higher than the voltage of the electric storage cell 224 to the state in which the voltage of the electric storage cell 222 is lower than the voltage of the electric storage cell 224. During this process, there occurs a timing at which the voltage difference between the electric storage cell 222 and the electric storage cell 224 is 0.

In the present embodiment, the control section 270 supplies the control signals φ22 and φ24 so that both of the switching device 252 and the switching device 254 are operated to be OFF, at a timing at which the voltage difference between the electric storage cell 222 and the electric storage cell 224 is 0 or extremely small. Accordingly, the balance correction circuit 232 can be stopped in the state in which the electric storage cell 222 and the electric storage cell 224 have been equalized with accuracy.

In the present embodiment, a case in which the switching operation does not include the third operation is explained. However, the switching operation may include the third operation. In addition, the control section 270 may change the ratio P of a time of the third operation to the period T according to a predetermined algorithm during operation of the balance correction circuit 232. The ratio P may be changed either regularly or successively. The ratio P may be changed according to the voltage difference between the electric storage cell 222 and the electric storage cell 224. When changing the ratio P, it is desirable to change the ratio P while maintaining to be constant the ratio of the time of the first operation and the time of the second operation.

In the present embodiment, a case in which the switching operation is repeated at a certain period T is explained. However, the control section 270 may change the period T according to a predetermined algorithm during operation of the balance correction circuit 232. The period T may be changed either regularly or successively. The period T may be changed according to the voltage difference between the electric storage cell 222 and the electric storage cell 224. When changing the period T, it is desirable to change the period T while maintaining the ratio of the time of the first operation and the time of the second operation constant.

Figure 6:
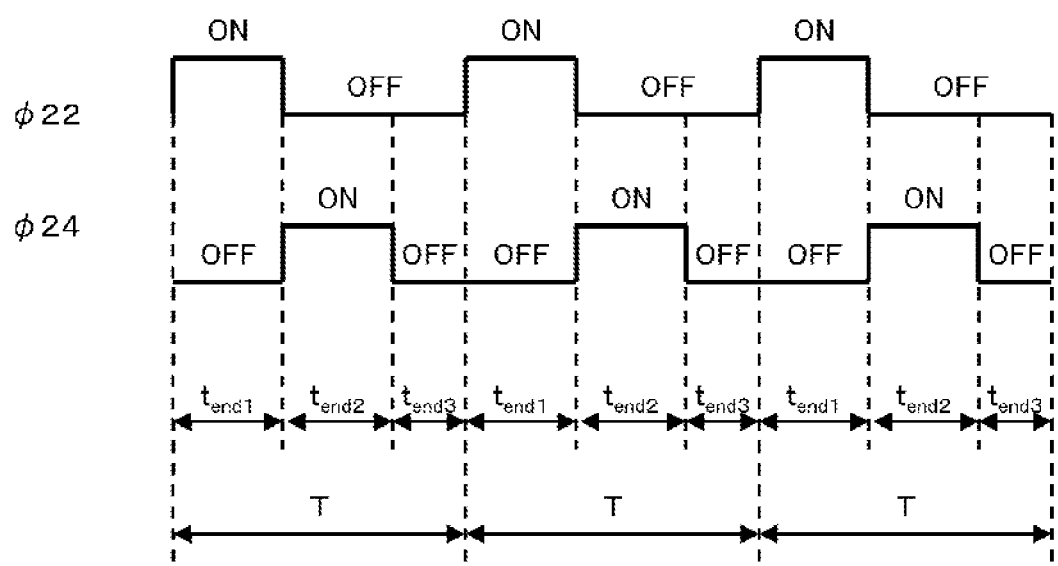
FIG. 6 schematically shows an example of the control signals $\varphi 22$ and $\varphi 24$ before operation stop.

FIG. 5 and FIG. 6 schematically show an example of the control signals φ22 and φ24 according to the third embodiment for determining the timing to stop the balance correction circuit 232. FIG. 5 shows an example of the control signals φ22 and φ24 immediately after operation start of the balance correction circuit 232. FIG. 6 shows an example of the control signals φ22 and φ24 immediately before operation stop of the balance correction circuit 232.

In the present embodiment, the balance correction circuit 232 periodically repeats the switching operation including a first operation in which the switching device 252 is operated to be ON and the switching device 254 is operated to be OFF, a second operation in which the switching device 252 is operated to be OFF and the switching device 254 is operated to be ON, and a third operation in which both of the switching device 252 and the switching device 254 are operated to be OFF.

In FIG. 5, T represents the period of the switching operation, $t_{in1}$ and $t_{in2}$ respectively represent the time of the first operation and the time of the second operation in the state immediately after the operation start of the balance correction circuit 232. Note that as shown in FIG. 5, in the present embodiment, immediately after the operation start of the balance correction circuit 232, the time $t_{in3}$ of the third operation (not illustrated in the drawing) is set to 0. In FIG. 6, $t_{end1}$, $t_{end2}$, and $t_{end3}$ respectively represent the time of the first operation, the time of the second operation, and the time of the third operation in the state immediately before the operation stop of the balance correction circuit 232.

As shown in FIG. 5 and FIG. 6, in the present embodiment, the switching device 252 is operated to be ON when the control signal φ22 is H logic, and is operated to be OFF when the control signal φ22 is L logic. The switching device 254 is operated to be ON when the control signal φ24 is H logic, and is operated to be OFF when the control signal φ24 is L logic.

In the present embodiment, the control section 270 supplies the control signals φ22 and φ24 to the switching device 252 and the switching device 254, to start the operation of the balance correction circuit 232. During this operation, the duty ratio of the control signals φ22 and φ24 is adjusted so that $t_{in1}=t_{in2}$.

During operation of the balance correction circuit 232, the control section 270 changes the ratio P of the time of the third operation to the period T of the switching operation according to the voltage difference between the electric storage cell 222 and the electric storage cell 224. During this operation, it is preferable to change the ratio P while maintaining to be constant the ratio of the time of the first operation and the time of the second operation. The ratio P may be changed either regularly or successively. The change in value of the ratio P may be either successive or stepwise.

In the present embodiment, the control section 270 adjusts the duty ratio of the control signals φ22 and φ24 so that the ratio P is higher as the voltage difference between the electric storage cell 222 and the electric storage cell 224 is smaller. Therefore, the control section 270 supplies the control signals φ22 and φ24 so that both of the switching device 252 and the switching device 254 are operated to be OFF, when the time of the third operation or the ratio of the time of the third operation to the period of the switching operation is equal to or greater than a predetermined value. Accordingly, the balance correction circuit 232 can be stopped at a timing at which the voltage difference between the electric storage cell 222 and the electric storage cell 224 becomes sufficiently small.

In the present embodiment, an example is explained in which the control section 270 adjusts the duty ratio of the control signals φ22 and φ24 so that $t_{in1}=t_{in2}$. However, when the voltage of the electric storage cell 222 is higher than the voltage of the electric storage cell 224, the control section 270 may adjust the duty ratio of the control signals φ22 and φ24 so that the time of the first operation is longer than the time of the second operation. When the voltage of the electric storage cell 222 is lower than the voltage of the electric storage cell 224, the control section 270 may adjust the duty ratio of the control signals φ22 and φ24 so that the time of the second operation is longer than the time of the first operation.

In the present embodiment, an example in which the switching operation is repeated at a certain period T is explained. However, the control section 270 may change the period T according to a predetermined algorithm during operation of the balance correction circuit 232. The period T may be changed either regularly or successively. The period T may be changed according to the voltage difference between the electric storage cell 222 and the electric storage cell 224. When changing the period T, it is desirable to change the period T while maintaining the ratio of the time of the first operation and the time of the second operation constant.

Figure 8:
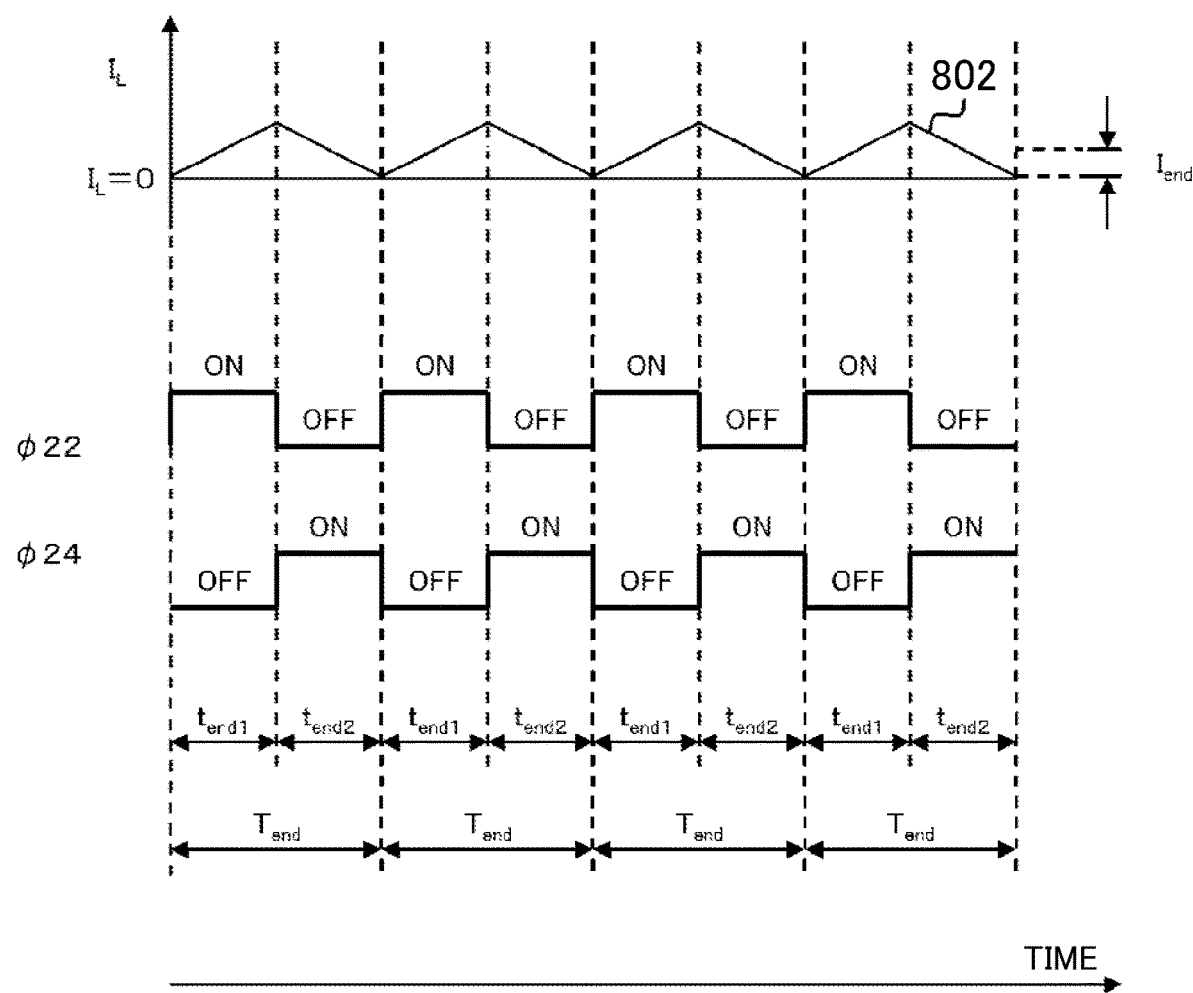
FIG. 8 schematically shows another example of the control signals $\varphi 22$ and $\varphi 24$ before operation stop.

FIG. 7 and FIG. 8 schematically show an example of the control signals φ22 and φ24 according to the third embodiment determining the timing at which the balance correction circuit 232 is stopped. FIG. 7 shows an example of the control signals φ22 and φ24 immediately after operation start of the balance correction circuit 232. FIG. 7 shows a graph 702 in association with an example of a waveform of the control signals φ22 and φ24. FIG. 8 shows an example of the control signals φ22 and φ24 immediately before operation stop of the balance correction circuit 232. FIG. 8 shows a graph 802 in association with an example of a waveform of the control signals φ22 and φ24.

In the present embodiment, the balance correction circuit 232 periodically repeats the switching operation including a first operation in which the switching device 252 is operated to be ON and the switching device 254 is operated to be OFF, and a second operation in which the switching device 252 is operated to be OFF and the switching device 254 is operated to be ON.

In FIG. 7, $T_{in}$, $t_{in1}$, and $t_{in2}$ respectively represent the period of the switching operation, the time of the first operation, and the time of the second operation in the state immediately after operation start of the balance correction circuit 232. In the graph 702 of FIG. 7, the horizontal axis represents the elapse of time. The vertical axis represents magnitude of the inductor current $I_L$. $I_{in}$ represents the maximum value of the inductor current $I_L$ in the state immediate after operation start of the balance correction circuit 232. In FIG. 8, $T_{end}$, $t_{end1}$, and $t_{end2}$ respectively show the period of the switching operation, the time of the first operation, and the time of the second operation in the state immediately before operation stop of the balance correction circuit 232. In the graph 802 of FIG. 8, the horizontal axis represents the elapse of time. The vertical axis represents magnitude of the inductor current $I_L$. $I_{end}$ represents the maximum value of the inductor current $I_L$ in the state immediately before operation stop of the balance correction circuit 232.

As shown in FIG. 7 and FIG. 8, in the present embodiment, the switching device 252 is operated to be ON when the control signal φ22 is H logic, and is operated to be OFF when the control signal φ22 is L logic. The switching device 254 is operated to be ON when the control signal φ24 is H logic, and is operated to be OFF when the control signal φ24 is L logic.

In the present embodiment, the control section 270 supplies the control signals φ22 and φ24 to the switching device 252 and the switching device 254, to start the operation of the balance correction circuit 232. During this operation, the duty ratio and timing of the control signals φ22 and φ24 are adjusted so that $t_{in1}=t_{in2}$ and so that it transitions to the next period when the inductor current $I_L$ becomes 0.

During operation of the balance correction circuit 232, the control section 270 changes the period of the switching operation according to the voltage difference of the electric storage cell 222 and the electric storage cell 224. During this operation, it is preferable to change the period while maintaining to be constant the ratio of the time of the first operation and the time of the second operation. The period may be changed either regularly or successively. The change in value of the period may be either successive or stepwise.

In the present embodiment, the control section 270 adjusts the duty ratio of the control signals φ22 and φ24 so that the period of the switching operation is shorter as the voltage difference between the electric storage cell 222 and the electric storage cell 224 is smaller. Therefore, the control section 270 supplies the control signals φ22 and φ24 so that both of the switching device 252 and the switching device 254 are operated to be OFF, when the period of the switching operation is equal to or smaller than a predetermined value. Accordingly, the balance correction circuit 232 can be stopped at a timing at which the voltage difference between the electric storage cell 222 and the electric storage cell 224 becomes sufficiently small.

In the present embodiment, an example is explained in which the control section 270 adjusts the duty ratio and timing of the control signals φ22 and φ24 so that $t_{in1}=t_{in2}$ and so that it transitions to the next period when the inductor current $I_L$ becomes 0. However, when the voltage of the electric storage cell 222 is higher than the voltage of the electric storage cell 224, the control section 270 may adjust the duty ratio of the control signals φ22 and φ24 so that the time of the first operation is longer than the time of the second operation. When the voltage of the electric storage cell 222 is lower than the voltage of the electric storage cell 224, the control section 270 may adjust the duty ratio of the control signals φ22 and φ24 so that the time of the second operation is longer than the time of the first operation.

In the present embodiment, a case in which the switching operation does not include the third operation is explained. However, the switching operation may include the third operation. In addition, the control section 270 may change the ratio P of a time of the third operation to the period T according to a predetermined algorithm during operation of the balance correction circuit 232. The ratio P may be changed either regularly or successively. The ratio P may be changed according to the voltage difference between the electric storage cell 222 and the electric storage cell 224. When changing the ratio P, it is desirable to change the ratio P while maintaining to be constant the ratio of the time of the first operation and the time of the second operation.

Figure 9:
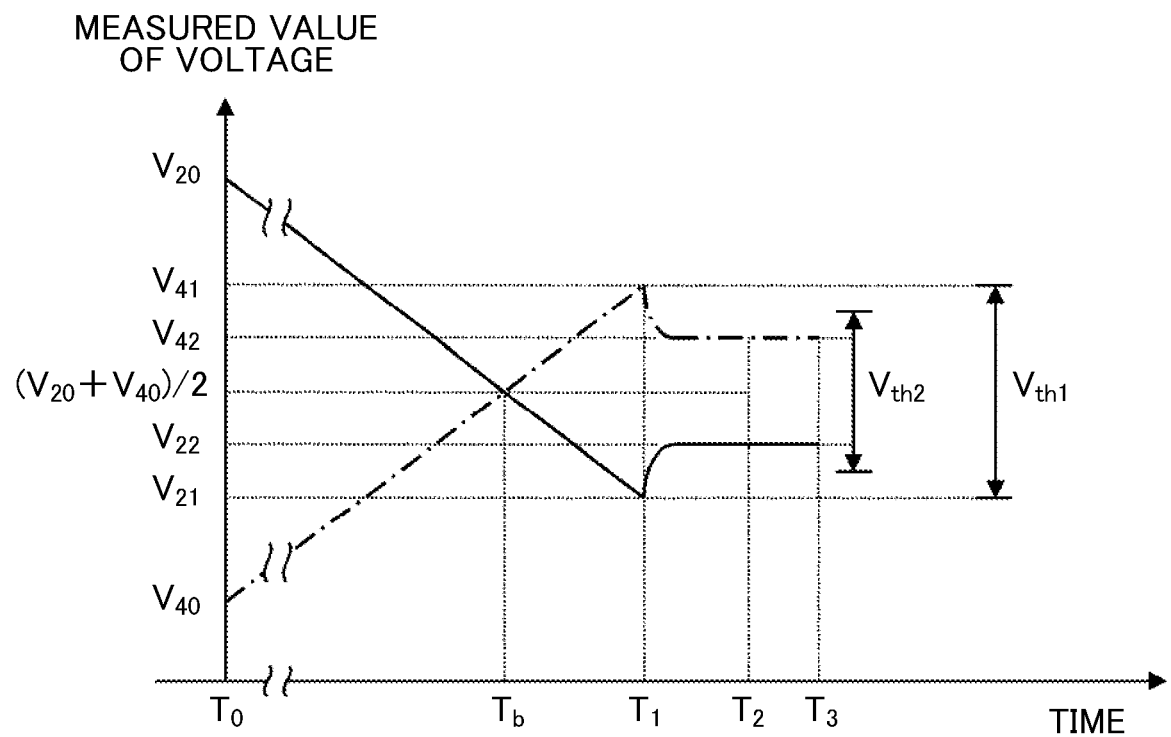
FIG. 9 schematically shows an example of the equalization operation of an electric storage system 210.

FIG. 9 schematically shows an example of the equalization operation of an electric storage system 210. With reference to FIG. 9, the following describes a control method of the balance correction circuit 232 performed by the control section 270 in a case in which the balance correction circuit 232 is stopped after reversal of the magnitude relation between the voltage of the electric storage cell 222 and the voltage of the electric storage cell 224.

In FIG. 9, the solid line represents chronological change of the voltage of the electric storage cell 222, and the long dashed short dashed line represents chronological change of the voltage of the electric storage cell 224. The time $T_0$ represents a time at which the assembly of the electric storage system 110 is ended, or a time at which charge or discharge is ended. $V_{20}$ represents the measured value of the voltage of the electric storage cell 222 at the time $T_0$, and $V_{40}$ represents the measured value of the voltage of the electric storage cell 224 at the time $T_0$. Note that $V_{20}$ is higher than $V_{40}$. In addition, $V_{th1}$ represents the first threshold value, and $V_{th2}$ represents the second threshold value.

For example, at the time $T_0$, charge or discharge of the electric storage system 110 ends. The balance correction circuit 232 may be operated prior to the time $T_0$, or may start the switching operation at the time $T_0$. After the time $T_0$, the balance correction circuit 232 resolves the variation in voltage between the electric storage cells caused during charge or discharge of the electric storage system 110.

The control section 270 supplies the control signals φ22 and φ24 to the switching device 252 and the switching device 254, so that the balance correction circuit 232 repeats the switching operation. By the switching operation repeating the balance correction circuit 232, electric energy is exchanged between the electric storage cell 222 and the electric storage cell 224. As a result, as time goes by, the voltage of the electric storage cell 222 is decreased, and the voltage of the electric storage cell 224 is increased.

At the time $T_b$, the voltage difference between the electric storage cell 222 and the electric storage cell 224 becomes 0. The control section 270 controls the balance correction circuit 232 to continue the switching operation without stopping the balance correction circuit 232. As a result, the magnitude relation between the voltage of the electric storage cell 222 and the voltage of the electric storage cell 224 will be reversed in the operational state of the balance correction circuit 232. After the time $T_b$, the measured value of the voltage of the electric storage cell 222 is lower than the measured value of the voltage of the electric storage cell 224.

At the time $T_1$, the absolute value of the voltage difference between the electric storage cell 222 and the electric storage cell 224 is equal to the first threshold value $V_{th1}$. In view of this, the control section 270 supplies the control signals φ22 and φ24 to the switching device 252 and the switching device 254 so that the balance correction circuit 232 stops the switching operation. In the present embodiment, the first threshold value $V_{th1}$ is determined such that the absolute value of the voltage difference between the electric storage cell 222 and the electric storage cell 224 at the time $T_2$ is equal to or smaller than the second threshold value $T_{th2}$. The time $T_2$ may be one minute elapsed from the time $T_1$.

When the balance correction circuit 232 stops at the time $T_1$, the voltage of the electric storage cell 222 increases from $V_{21}$ to $V_{22}$, and the voltage of the electric storage cell 224 decreases from $V_{41}$ to $V_{42}$. Accordingly, the absolute value of the voltage difference between the electric storage cell 222 and the electric storage cell 224 at the time $T_2$ will be smaller than the absolute value of the voltage difference between the electric storage cell 222 and the electric storage cell 224 at the time $T_1$.

The control section 270 stops the balance circuit 232 till the time $T_3$. Accordingly, hunting of the balance correction circuit 232 can be effectively prevented. The control section 270 restarts the operation of the balance correction circuit 232, after the time $T_3$ and when the absolute value of the voltage difference between the electric storage cell 222 and the electric storage cell 224 during a time in which the balance correction circuit 232 is stopped becomes equal to or greater than the second threshold value $V_{th2}$.

In the present embodiment, a case in which $V_{22}$ is smaller than $V_{42}$ at the time $T_2$ is explained. However, the control method of the balance correction circuit 232 by means of the control section 270 is not limited to the present embodiment. The control section 270 may perform control so that $V_{22}$ is equal to $V_{42}$ at the time $T_2$, or $V_{22}$ is higher than $V_{42}$ at the time $T_2$. When control is performed so that $V_{22}$ is higher than $V_{42}$ at the time $T_2$, the time difference between the time $T_b$ and the time $T_1$ can be shortened.

Figure 10:
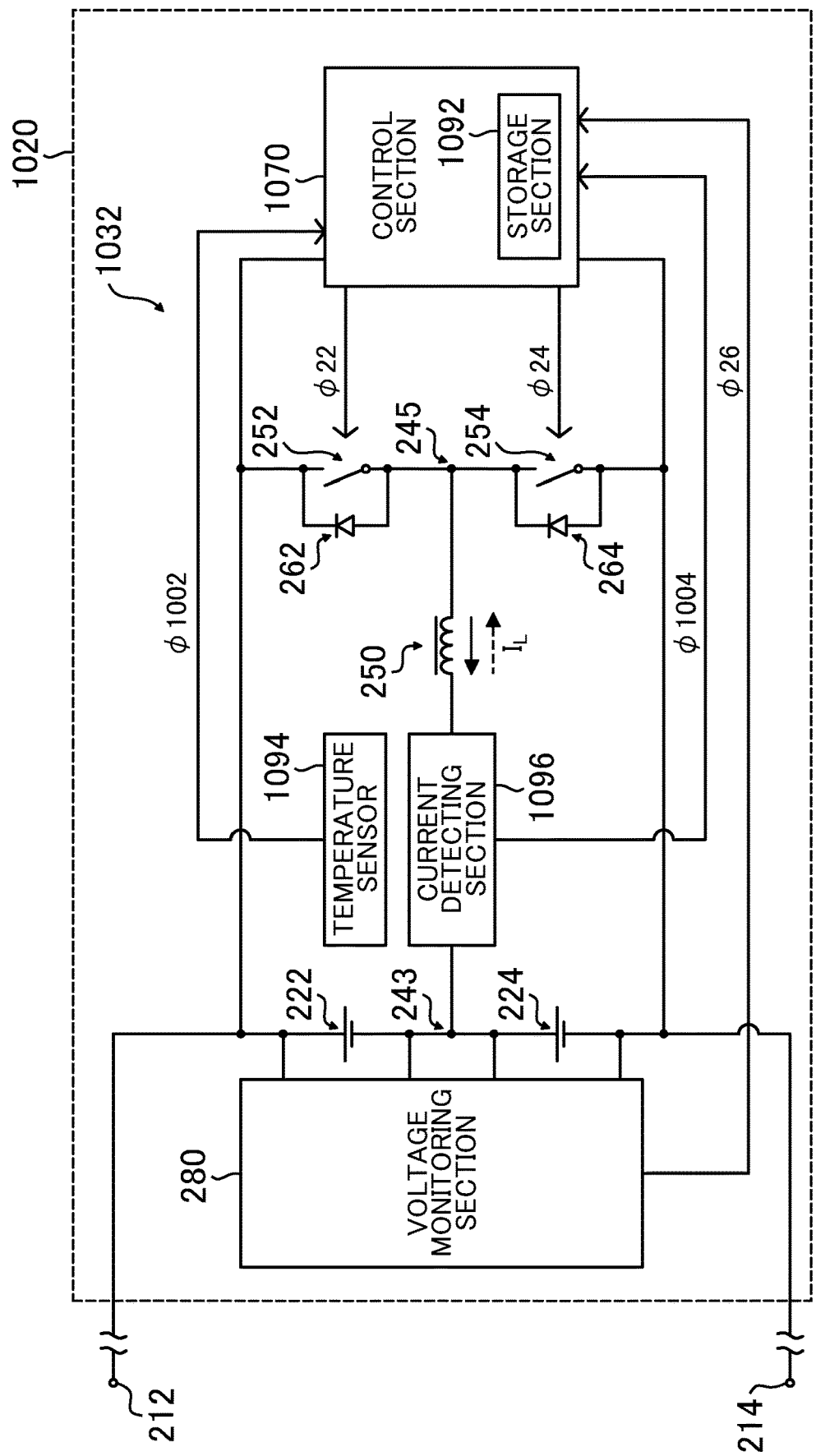
FIG. 10 schematically shows an example of the electric storage module 1020.

FIG. 10 schematically shows an example of the electric storage module 1020. The electric storage module 1020 is different from the electric storage module 220 in that it includes the balance correction circuit 1032 instead of the balance correction circuit 232. The balance correction circuit 1032 is different from the balance correction circuit 232 in that it further includes a temperature sensor 1094 and a current detecting section 1096, and includes a control section 1070 instead of the control section 270. The electric storage module 1020 as well as each part of the electric storage module 1020 such as the balance correction circuit 1032 may have a configuration similar to that of the electric storage module 220 as well as each part of the electric storage module 220. Note that the explanation is omitted for the configuration except for the different configuration mentioned above.

The control section 1070 determines the first threshold value $V_{th1}$ at least based on the current value of the inductor 250 and the direct current resistance value of the electric storage cell 222. In the present embodiment, the control section 1070 includes a storage section 1092 at least storing information representing correspondence relation between the temperature of the electric storage cell 222 and the direct current resistance value of the electric storage cell 222. The control section 1070 obtains, from the temperature sensor 1094, the signal φ1002 including information representing the temperature of the electric storage cell 222. The control section 1070 obtains, from the current detecting section 1096, the signal φ1004 including information representing the current value of the inductor 250.

The control section 1070 may determine the first threshold value $V_{th1}$ using the direct current resistance value of the electric storage cell 222 corresponding to the temperature of the electric storage cell 222. Specifically, the control section 1070 obtains the direct current resistance value corresponding to the temperature of the electric storage cell 222 represented by the signal φ1002, by referring to the information representing the correspondence relation between the direct current resistance value of the electric storage cell 222 and the temperature of the electric storage cell 222 stored in the storage section 1092. The control section 1070 determines the first threshold value $V_{th1}$ based on the current value of the inductor 250 indicated by the signal φ1004 and the direct current resistance value of the electric storage cell 222 obtained by referring to the storage section 1092. For example, the control section 1070 determines the first threshold value $V_{th1}$ by multiplying the current value of the inductor 250 by the direct current resistance value of the electric storage cell 222.

The control section 1070 may determine the first threshold value $V_{th1}$ based on the current value of the inductor 250, the direct current resistance value of the electric storage cell 222, and the direct current resistance value of the electric storage cell 224. The control section 1070 may determine the first threshold value $V_{th1}$ using the direct current resistance value of the electric storage cell 222 corresponding to the temperature of the electric storage cell 222, and the direct current resistance value of the electric storage cell 224 corresponding to the electric storage cell 224. In this case, the storage section 1092 may further store information representing correspondence relation between the temperature of the electric storage cell 224 and the direct current resistance value of the electric storage cell 224.

The temperature sensor 1094 at least measures the temperature of the electric storage cell 222. The temperature sensor 1094 conveys the signal φ1002 at least including information representing the temperature of the electric storage cell 222, to the control section 1070. The temperature sensor 1094 may be a contact sensor, or a non-contact sensor. The temperature sensor 1094 may be a thermistor, or an radiation thermometer. It is possible to provide temperature sensors in number which is the same as the number of the electric storage cells, to correspond to the plurality of electric storage cells respectively, or to use a single temperature sensor to measure the temperature of the plurality of electric storage cells.

The current detecting section 1096 detects the current flowing to the inductor 250, and conveys the signal φ1004 including information representing the current value of the inductor 250, to the control section 1070. The current detecting section 1096 may be a shunt resistance, and the signal φ1004 may be information representing the magnitude of the voltage generated by the shunt resistance. The current detecting section 1096 may be an ammeter.

In the present embodiment, a case in which the control section 1070 determines the first threshold value $V_{th1}$ based on at least one of the temperature of the electric storage cell 222 and the current value of the inductor 250 was explained. However, the balance correction circuit 1032 is not limited to the present embodiment. The control section 1070 may determine the first threshold value $V_{th1}$ based on at least one of the temperature of the electric storage cell 222, the temperature of the electric storage cell 224, and the current value of the inductor 250. The control section 1070 may use the temperature of one electric storage cell or a plurality of electric storage cells measured by the temperature sensor 1094, as the temperature of other electric storage cells not having been measured by the temperature sensor 1094.

In the present embodiment, a case in which the control section 1070 includes a storage section 1092 is explained. However, the balance correction circuit 1032 is not limited to the present embodiment. The storage section 1092 may be provided outside the control section 1070.

In the present embodiment, an example is explained in which the balance correction circuit 232 causes the electric energy to be exchanged between the electric storage cell 222 and the electric storage cell 224 via the inductor 250. However, the balance correction circuit 232 is not limited to the present embodiment. The balance correction circuit 232 may be a balance correction circuit as shown in Japanese Patent Application Publication No. H10-257682, that uses a resistance for discharge and a switching device for controlling a current of the resistance, to cause the electric storage cell having a higher voltage to discharge. The resistance for discharge may be an example of a voltage adjusting section.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCE NUMERALS 100 apparatus
102 motor
110 electric storage system
112 terminal
114 terminal
116 protection circuit
120 electric storage module
122 electric storage cell
124 electric storage cell
126 electric storage cell
128 electric storage cell
132 balance correction circuit
134 balance correction circuit
136 balance correction circuit
143 connection point
145 connection point
147 connection point
210 electric storage system
212 terminal
214 terminal
216 protection circuit
220 electric storage module
222 electric storage cell
224 electric storage cell
232 balance correction circuit
243 connection point
245 connection point
250 inductor
252 switching device
254 switching device
262 diode
264 diode
270 control section
280 voltage monitoring section
282 voltage detecting section
284 voltage detecting section
286 difference detecting section
302 graph
304 graph
306 graph
702 graph
802 graph
1020 electric storage module
1032 balance correction circuit
1070 control section
1092 storage section
1094 temperature sensor
1096 current detecting section

What is claimed is:

1. A balance correction apparatus that equalizes voltages of a first electric storage cell and a second electric storage cell connected in series, comprising:
   an inductor having an end electrically connected to a connection point between an end of the first electric storage cell and an end of the second electric storage cell;
   a first switching device electrically connected between another end of the inductor and another end of the first electric storage cell;
   a second switching device electrically connected between another end of the inductor and another end of the second electric storage cell; and
   a control section supplying a control signal to control ON/OFF operations of the first switching device and the second switching device, to the first switching device and the second switching device, wherein
   the control section obtains information representing a voltage difference between the first electric storage cell and the second electric storage cell, and
   the control section supplies the control signal to cause both of the first switching device and the second switching device to operate to be OFF, when the voltage difference is equal to or smaller than a predetermined value, wherein
   the control section supplies the control signal so that the balance correction apparatus repeats, at a predetermined period of time, a cycle of switching operations including a first operation in which one of the first switching device and the second switching device is operated to be ON and the other switching device is operated to be OFF, followed by a second operation in which the one switching device is operated to be OFF and the other switching device is operated to be ON, followed by a third operation in which both of the first switching device and the second switching device are operated to be OFF, a single repetition of the cycle including only one instance of each of the first operation, the second operation, and the third operation, such that the first operation, second operation, and third operation are repeated only by repetition of the cycle,
   the control section supplies the control signal so that a ratio of a time of the third operation within each repetition of the cycle to the predetermined period of time increases as the voltage difference decreases, and
   the control section supplies the control signal so that both of the first switching device and the second switching device are operated to be OFF, when the increased time of the third operation within each repetition of the cycle or the increased ratio of the time of the third operation within each repetition of the cycle to the predetermined period of time is equal to or greater than a predetermined value.

2. An electric storage system comprising:
   a first electric storage cell and a second electric storage cell connected in series; and
   the balance correction apparatus according to claim 1, equalizing voltages of the first electric storage cell and the second electric storage cell.

3. The balance correction apparatus according to claim 1, wherein
   the control section includes a variable pulse generator, the variable pulse generator configured to generate a pulse array for each switching device as the control signal, and the ratio of the time of the third operation is increased by reducing the ON period of a square wave of each pulse array within each repetition of the cycle while maintaining the predetermined period of time of each repetition of the cycle.

4. A balance correction apparatus that equalizes voltages of a first electric storage cell and a second electric storage cell connected in series, comprising:
an inductor having an end electrically connected to a connection point between an end of the first electric storage cell and an end of the second electric storage cell;
a first switching device electrically connected between another end of the inductor and another end of the first electric storage cell;
a second switching device electrically connected between another end of the inductor and another end of the second electric storage cell; and
a control section supplying a control signal to control ON/OFF operations of the first switching device and the second switching device, to the first switching device and the second switching device, wherein
the control section obtains information representing a voltage difference between the first electric storage cell and the second electric storage cell, and
the control section supplies the control signal to cause both of the first switching device and the second switching device to operate to be OFF, when the voltage difference is equal to or smaller than a predetermined value, wherein
the control section supplies the control signal so that the balance correction apparatus repeats, at an adjustable period of time, a cycle of switching operations including a first operation in which one of the first switching device and the second switching device is operated to be ON and the other switching device is operated to be OFF, followed by a second operation in which the one switching device is operated to be OFF and the other switching device is operated to be ON, a single repetition of the cycle including only one instance of each of the first operation and the second operation, such that the first operation and the second operation are repeated only by repetition of the cycle,
the control section supplies the control signal so that the adjustable period of time of each successive repetition of the cycle shortens as the voltage difference decreases, and
the control section supplies the control signal so that both of the first switching device and the second switching device are operated to be OFF, when the adjustable period of time of a repetition of the cycle is equal to or smaller than a predetermined value.

5. An electric storage system comprising:
a first electric storage cell and a second electric storage cell connected in series; and
the balance correction apparatus according to claim 4, equalizing voltages of the first electric storage cell and the second electric storage cell.

6. The balance correction apparatus according to claim 4, wherein
the control section includes a variable pulse generator, the variable pulse generator configured to generate a pulse array for each switching device as the control signal, and
the period of time of each successive repetition of the cycle shortens by reducing the period of a square wave of each pulse array within each repetition of the cycle.

7. A balance correction apparatus for equalizing voltages of a first electric storage cell and a second electric storage cell connected in series, comprising:
a first switching device having an end electrically connected to a connection point between an end of the first electric storage cell and an end of the second electric storage cell, and another end electrically connected to another end of the first electric storage cell;
a voltage adjusting section connected to the first electric storage cell and the first switching device in series, between the first electric storage cell and the first switching device, and adjusting a voltage of the first electric storage cell; wherein
the control section supplies the control signal so that the balance correction apparatus repeats, at a predetermined period of time, a cycle of switching operations including a first operation in which one of the first switching device and the second switching device is operated to be ON and the other switching device is operated to be OFF, followed by a second operation in which the one switching device is operated to be OFF and the other switching device is operated to be ON, a single repetition of the cycle including only one instance of each of the first operation and the second operation, such that the first operation and the second operation are repeated only by repetition of the cycle,
the control section obtains information representing a voltage difference between the first electric storage cell and the second electric storage cell,
the control section supplies, in response to (i) a measured voltage of the first electric storage cell being higher than a measured voltage of the second electric storage cell, (ii) the measured value of the first electric storage cell decreasing, and (iii) the measured value of the second electric storage cell increasing, the first control signal so that a ratio of a time of the first operation to a time of the second operation within each repetition of the cycle is such that the measured voltage of the first electric storage cell continues to decrease while the measured voltage of the second electric storage cell continues to increase causing a magnitude relation between the measured voltage of the first electric storage cell and the measured voltage of the second electric storage cell to reverse, and
the control section supplies the control signal so that both of the first switching device and the second switching device are operated to be OFF, when the measured voltage of the second cell becomes greater than the measured voltage of the first cell by a first threshold value.

8. The balance correction apparatus according to claim 7, wherein
the first threshold value is determined taking into consideration apparent voltage fluctuation of the first electric storage cell caused when the balance correction apparatus is stopped.

9. The balance correction apparatus according to claim 7, wherein
the first threshold value is equal to or above 0.5 mV and equal to or below 100 mV.

10. The balance correction apparatus according to claim 7, wherein
after the magnitude relation between the voltage of the first electric storage cell and the voltage of the second electric storage cell is reversed, the control section stops the balance correction apparatus for a predetermined time after the first control signal is supplied to operate the first switching device to be OFF when the absolute value of the voltage difference in an operational state of the balance correction apparatus is equal to or greater than the first threshold value.

11. The balance correction apparatus according to claim 10, wherein after the predetermined time has elapsed, the control section supplies the first control signal to operate the first switching device to be ON when the absolute value of the voltage difference between the first electric storage cell and the second electric storage cell becomes equal to or greater than the first threshold value in a stop state of the balance correction apparatus.

12. The balance correction apparatus according to claim 7, further comprising a second switching device having an end electrically connected to a connection point between an end of the first electric storage cell and an end of the second electric storage cell, and another end electrically connected to another end of the second electric storage cell, wherein the voltage adjusting section is an inductor, the inductor has one end electrically connected to a connection point between an end of the first electric storage cell and an end of the second electric storage cell, and another end electrically connected to one end of the first switching device and one end of the second switching device, the control section supplies, to the second switching device, a second control signal for controlling ON/OFF operations of the second switching device, and after the magnitude relation between the voltage of the first electric storage cell and the voltage of the second electric storage cell is reversed, the control section supplies the first control signal and the second control signal so that both of the first switching device and the second switching device are operated to be OFF when the absolute value of the voltage difference in an operational state of the balance correction apparatus is equal to or greater than the first threshold value.

13. The balance correction apparatus according to claim 7, wherein the control section obtains information representing a current value of the voltage adjusting section, and the control section determines the first threshold value based on the current value of the voltage adjusting section and a direct current resistance value of the first electric storage cell.

14. The balance correction apparatus according to claim 13, further comprising a storage section that stores information representing correspondence relation between a temperature of the first electric storage cell and a direct current resistance value of the first electric storage cell, the control section obtains information representing a temperature of the first electric storage cell, the control section obtains the direct current resistance value of the first electric storage cell corresponding to the temperature of the first electric storage cell by referring to the information representing the correspondence relation stored in the storage section, and the control section determines the first threshold value based on the current value of the voltage adjusting section, and the direct current resistance value of the first electric storage cell corresponding to the temperature of the first electric storage cell.

15. The balance correction apparatus according to claim 13, wherein the control section determines the first threshold value based on the current value of the voltage adjusting section, the direct current resistance value of the first electric storage cell, and the direct current resistance value of the second electric storage cell.

16. An electric storage system comprising:

a first electric storage cell and a second electric storage cell connected in series; and the balance correction apparatus according to claim 7, equalizing voltages of the first electric storage cell and the second electric storage cell.

17. The balance correction apparatus according to claim 7, wherein the control section includes a variable pulse generator, the variable pulse generator configured to generate a pulse array for each switching device as the control signal.

* * * * *